United States Patent [19]

Apgar, IV

[11] Patent Number: 5,680,305
[45] Date of Patent: Oct. 21, 1997

[54] SYSTEM AND METHOD FOR EVALUATING REAL ESTATE

[76] Inventor: Mahlon Apgar, IV, 7321 Brightside Rd., Baltimore, Md. 21212

[21] Appl. No.: 389,920

[22] Filed: Feb. 16, 1995

[51] Int. Cl.⁶ .................................. G06F 15/18
[52] U.S. Cl. ............... 364/401 R; 364/408; 364/402
[58] Field of Search .................. 364/401 R, 402, 364/408

[56] References Cited

U.S. PATENT DOCUMENTS

| | | | |
|---|---|---|---|
| 5,006,998 | 4/1991 | Yasunobu et al. | 364/408 |
| 5,361,201 | 11/1994 | Jost et al. | 364/401 |
| 5,414,621 | 5/1995 | Hough | 364/401 |

OTHER PUBLICATIONS

S/W Name: "Rems Investors Series" Date: 1989 Version 4,0; Producer: Good Software Corp Acc.#00011114.
S/W Name: "Aardvark Investment Planner" Date 1984 Producer: Cyma–McGraw–Hill; Accession #00030278.
Prod. Name: Industrial Lead System; Vendor Quality Business Solutions P/L; Accession #00251753.
"Whate is Cognitive Computing" by Johnson, Colin Source Dr. Dobb's Journal Feb. 1993 Accession #00046823.
"On–line Computer Real Estate Services" by Anne Marie Kerwin Editor & Publisher Nov. 28, 1992.
Prod Name "Real Scan Real Estate Informtion System 2.0" by Laser Scan Systems, Inc. Aug. 1, 1988; accession #00265813.
"Database Marketing"; Catalog Age Roundtable May 1988 pp. 85–97.

*Primary Examiner*—Gail O. Hayes
*Assistant Examiner*—Gita D. Shingala
*Attorney, Agent, or Firm*—Testa, Hurwitz & Thibeault, LLP

[57] ABSTRACT

Systems and methods of the invention provide objective evaluations of a business entity's real estate situation and condition for use by customers including (but not limited to) the business entity. Information is processed to determine indicators of amount, price, area, grade, and risk; and those indicators are combined to provide a total score. The system includes a database for storing a variety of data, such as utilization measures and business information, and data corresponding to businesses which are similar to the business entity. Process actuators process the information to derive the several indicators, the score, and other measures, which is printed or displayed for customers and/or the business entity. Preferably, a report is generated which details information including the score to provide a well-rounded picture of a particular real estate situation.

22 Claims, 21 Drawing Sheets

SYSTEM AND METHOD FOR EVALUATING REAL ESTATE

BACKGROUND

Historically, big corporations and sophisticated users have had an implicit strategy for their facilities portfolios. Increasingly, they need explicit information on how they are performing in real estate and occupancy cost management. All users—big and small alike—implement their strategies through transactions. At each stage of the transaction process—from scanning the market, to choosing buildings and spaces within them, to negotiating the lease or buy component, to occupancy—there are a number of participants who use information. Typically, the transaction process is very compressed: even small firms make multi-million dollar decisions in a few intensive months of review and negotiation. But because they only do so sporadically, they do not apply the same disciplines as in other business functions and usually lack reliable, robust information to support their decisions.

For example, although a typical real estate commitment for a small firm of twenty people is a $2 Million transaction over the life of the lease or contract, few participants look at it that way: the BROKER talks about it as a $20/SF "deal," the ARCHITECT sees it as a 10,000 SF design, the MANAGER sees it as a $200,000/year operating expense, and the CONTRACTOR sees it as a $300,000 project; but the COMPANY should see it as a $2 Million business commitment.

In effect, there is, presently, no rigorous means for evaluating real estate from the users' perspective, and for assisting those users transacting business on such real estate. Further, the diverse real estate nomenclature, the infrequency of the typical user's transactions relating to real estate, and the wide scope of factors affecting any given real estate "deal", inhibits effective decision making. Unfortunately, a mistake by a company in such decisions can be costly.

Accordingly, one object of the invention is to provide systems and methods for evaluating real estate for purchase, lease, and/or use by a business.

A further object of the invention is to provide a system for efficiently assisting businesses in making real estate decisions and in a manner which provides quantitative evaluation of factors associated with a prospective real estate transaction.

These and other objects of the invention will be apparent in the description which follows.

SUMMARY OF THE INVENTION

As used herein, "Score" is a quantitative evaluation of a Business Entity's real estate condition. "Real Estate Ratios" are used herein to describe a company's facilities situation. "Market Condition", "Transaction data" and "Facility Relocation data" are used herein to denote options and constraints on facility actions. "Business Entity" means any individual, organization, enterprise, business, company, corporation, or partnership, including partnerships of multiple corporations, that occupies real estate for non-residential use, including for commercial, industrial, government and non-profit functions, or which contemplates a real estate purchase, lease, use, and/or rental. "Real Estate" means any real property, including, without limitation, office, retail and industrial rental space, a building, and multiple buildings for use by a business entity, or one or more facilities or buildings that a business entity occupies for the purpose of conducting its operations on a routine and ongoing basis.

Also as used herein, "Use" means the specified, intended or actual function and purpose for which a business entity employs its real estate, including such functions as office work, manufacturing, storage and retailing. "Utilization" means the efficiency with which real estate is used by an occupant. For example, "Space Utilization" means the efficiency by which the space of a real estate is being employed, where high space utilization signifies efficient use of space; and "Cost Utilization" means the efficiency by which the cost of a real estate is being used, where high cost utilization signifies low cost of space. "Market" means a geographic region, e.g., the Boston metropolitan area, that includes all buildings or potential buildings available for business occupancy, with boundaries that are consistent with U.S. Census standards and that are generally accepted definitions of metropolitan areas. "Submarket" means a geographic area as a subset of a Market and that includes buildings or potential buildings available for business occupancy, with boundaries generally accepted by local real estate professionals. "Grade" means the designated quality of real estate on a relative scale of quality, from low to high, generally accepted within a real estate market. "Rent" means the annual amount paid by a business entity for rights to occupy real estate. "Vacancy Rate" means the percentage of square feet that is offered for lease in a market, submarket or building. "Absorption" means the net reduction in vacant square feet over a defined period (typically, twelve-months) resulting from new tenants, new construction, and lease terminations. "Comparable Real Estate" means real estate that is approximately equivalent in Rent, Grade, Use and/or location to the business entity's Real Estate. "Similar Business Entities" are those entities which are compared to a Business Entity, such as those Business Entities which have a standard industrial classification code, i.e., a SIC code, that is similar to the Business Entity. "Indicator" means a quantitative measure of a particular factor affecting Real Estate.

The Score is generally determined by five indicators of Amount, Price, Grade, Area and Risk. Therefore, as used herein, "Amount" means an indicator of a business entity's space utilization of real estate; and it is based primarily upon square feet per employee, and/or sales or revenues per square foot. "Price" means an indicator of a business entity's cost utilization of real estate; and it is based primarily upon the rent per square foot, the rent per employee, and/or the rent to sales of the business entity in that real estate. "Grade" means an indicator of the quality of real estate, such as a building; and it is based primarily upon generally accepted classification structure, such as Class A, B or C properties. "Area" means an indicator of economic attractiveness of the submarket where the real estate is located; and it is based, for example, upon rents, vacancy, absorption rate and/or other measures of economic attractiveness of a submarket. "Risk" means an indicator of the financial, market and environmental exposure of real estate and of the financial, market and environmental risks associated with the employees and the business entity's occupancy in the real estate. The Score composite of these five indicators is also referred to as "The Apgar Score".

"Customer" is used to denote a user of the Invention, such as an individual or Business Entity, which desires information about Real Estate. Further, Real Estate is sometimes denoted as "targeted" real estate to identify one or more particular Real Estate locations under investigation. "Weighting Factor" is used to denote an empirically determined adjustment for each indicator, indicator component or measure used in the Score to reflect the indicator's relative importance in the overall evaluation. "Measure" is used to denote a quantitative and qualitative fact and/or calculation from data about a Business Entity's real estate situation used to determine values for score Indicators. "Tenancy Status" is used to denote whether a business entity owns and occupies the real estate, or whether the business entity leases or rents and occupies the real estate, and the time remaining on the lease(s) or other contractual obligation(s). "Encumberances" is used to describe whether a lien and/or any other contingent forfeiture of ownership by the business entity is associated with financial obligations of the business entity for the real estate, and the time remaining of those obligations.

The invention provides, in one aspect, a method for evaluating Real Estate for use by a Business Entity. The method includes the steps of (A) storing Utilization information—including (i) square footage data representing square footage of the Real Estate, (ii) usage data characterizing the selected Use(s), (iii) cost data including a Rental price of the Real Estate—about the Real Estate in a database, (iv) data representing the number of employees of the business in the real estate, and (v) data representing sales or revenues of the Business Entity in the real estate; (B) storing data representing Utilization values in the database from Business Entities which are similar to the Business Entity; (C) determining a Utilization Indicator of the Real Estate—wherein the Utilization Indicator has a numerical representation and is a function of (i) the square footage, (ii) the selected Use, (iii) the Utilization values, and (iv) the cost data including the Rental Price—by processing information in the database; (D) processing the numerical representation to produce a Score representing a quantitative evaluation of the Real Estate; and (E) communicating the Score to the Customer.

The invention thus provides information to business entities in a dynamic and intelligent manner. It assumes that company decision-makers need information that links real estate to the business in a meaningful way. The invention further provides advantages in supporting business planning and management with real estate information delivered through hard copy reports, on-line service, computerized information transfers, telephone consultation, and in-person consultation in at least six Customer market segments referred to hereinafter as business entities: businesses, investors, property developers/managers, real estate-related intermediaries, government users, and all others. The invention provides clear, unbiased, and objective information on such business entities, thereby assisting Customers in making real estate decisions.

Without limitation, the preferred Customers of the invention include: (1) business users, made up of large, mid-size and small companies, which need information on rents, space utilization, and business/real estate measures; (2) investors, including banks, pension funds and insurance companies which provide the financing for most commercial real estate, and need information for tenant retention, demand forecasts and real estate affordability for tenants; (3) property developers/managers who need information for tenant retention, demand forecasts and affordability; (4) real estate intermediaries, including real estate brokers, appraisers, accountants, lawyers, architects and other real estate service providers, who need business/real estate measures and lease expiration profiles for their own customer development; and (5) government agencies and local governments that require user-based assessments similar to business users.

The number of these potential Customers is substantial; and thus the invention provides advantages to such Customers by providing real estate evaluations in an objective, cost-effective, timely and quantitative manner. It is estimated that in the United States as many as 20 Million business, professional, non-profit and governmental organizations use real estate for their operations. Further, almost 700,000 intermediaries—brokers, lawyers, architects, property managers, consultants etc.—service these organizations; almost 50,000 institutions—banks, pension funds, savings institutions—invest in real estate; and as many as 100,000 government agencies lease, own and/or regulate space. In addition, the invention provides useful information assessments to Customers as the Business Entity's business mix changes, such as when (1) competition focuses business managers' attention on cost reduction and growth—including occupancy and location; (2) re-engineering challenges assumptions including changes in real estate types (office, industrial, retail) and building grades; (3) technology improvements increase the potential for alternative locations and building types; and (4) changes in capital markets structure lead to reevaluation of real estate investments, including interest rates, real estate supply and demand, and investment rates of return.

In another aspect, the invention supports three types of business needs: (1) self analysis by a company evaluating real estate performance over time and among peers, (2) decision support to identify essential factors driving real estate decisions, and (3) customer development by real estate intermediaries seeking customers.

Generally, the data needs for the invention include information representative of rent, square feet, lease expiration, staffing levels and sales. Thus, in another aspect, the invention includes a database including information about one or more of the following: (1) the annual rent paid by a company for its real estate, (2) the square feet of the real estate occupied, (3) the expiration of the Business Entity's real estate leases, (4) the number of employees of the Business Entity in the real estate, and (5) the sales volumes of the Business Entity in the real estate.

The database preferably includes other information, in accord with further aspects of the invention, including: square footage data representing a square footage of the real estate, usage data characterizing the selected use, and rental data representing a rental price of the real estate; space utilization data values, cost utilization data values of comparable real estate, building classification information, including a data classification of the real estate that is consistent with local building standards, and data classifications, consistent with local building standards, of buildings of the comparable real estate; area information, including rent data, vacancy data, absorption rate data, and area information data of other business entities; financial, market and environmental risk information, including data representing an age of a building at the real estate, data representing locations of naturally occurring and man-made environmental hazards; data representing the tenancy status and encumbrances of the Business Entity for the real estate; and data representing real estate supply, demand, pricing, regulation, transportation, infrastructure and other economic conditions.

The preferred Customers of the invention are generally characterized as follows: Large Customers have sophisticated, on-going information needs to manage large, dynamic portfolios; while other Customers have only periodic information needs linked to real estate transactions. All Customers may receive a broad hierarchy of information, including printed manuals, definitions of key indicators, analytical reports of internal performance and market trends, simplified and detailed analyses with the Score, specific inquiries on individual facilities, and decision scenario modeling software.

Three types of analyses access information on the database: (1) trend analysis of key facilities measures over time within the firm, (2) benchmarks of key indicators across firms within an industry, and (3) the analyses associated with the Score. According to another aspect of the invention, software is also available for Customers to do their own "what-if" analyses.

Self analysis reports enables Customers to identify "hidden" cost trends. A report for one company, for example, shows that while occupancy cost per square foot fell 20% over a six year period, it added space twice as fast as staff. This growth mismatch resulted in a 50% increase in square feet per person and a one third excess in annual occupancy cost. The invention can thus be used to highlight such trends before they spiral out of control.

In still another aspect of the invention, the Score includes five basic indicators of real estate health: Amount, Price, Grade, Area and Risk. Preferably, each of these indicators is scaled for a total potential score of 10. Low scores highlights the need for the Business Entity's top management to focus on real estate issues. This Score can be used to evaluate a Business Entity's real estate portfolio and to report real estate condition to the decision makers and/or Customer. Accordingly, the invention is suitable for those Customers/decision-makers who are not real estate specialists and who find real estate issues complicated and confusing.

The invention further provides, in another aspect, support information for each Business Entity group, including: (1) Market Overviews of the submarkets in a metropolitan area, sourced and updated periodically; and (2) Facility Relocations and/or Transactions Reports in each submarket sourced from a business database and updated during the normal reporting cycle using sources such as the National Change of Address database and/or revisions to lease expiration dates. To provide this type of submarket data, the invention provides submarket boundaries for a selected number of markets.

The display of information features, in accord with another aspect of the invention, seven sections: (1) an identification section for specifying the company, location and operational highlights; (2) a Score section; (3) a detailed real estate data section; (4) a key real estate ratios section which relate real estate to business measures; (5) a market conditions section reporting the state of the surrounding real estate market; (6) a facilities relocations and/or transactions section that lists selected activity in the surrounding real estate market; and (7) definitions of real estate terms so the report is usable by real estate experts and non-experts alike.

On a market-by-market basis, and in accord with another aspect of the invention, the database is periodically updated, for example on a quarterly or semi-annual basis, with information of those leases due to expire in the next year, along with their square footage, current rent, address, contact and phone numbers.

These and other advantages and aspects of the invention are evident in the description which follows and in the accompanying drawings.

DETAILED DESCRIPTION OF THE DRAWINGS

Figure 1:
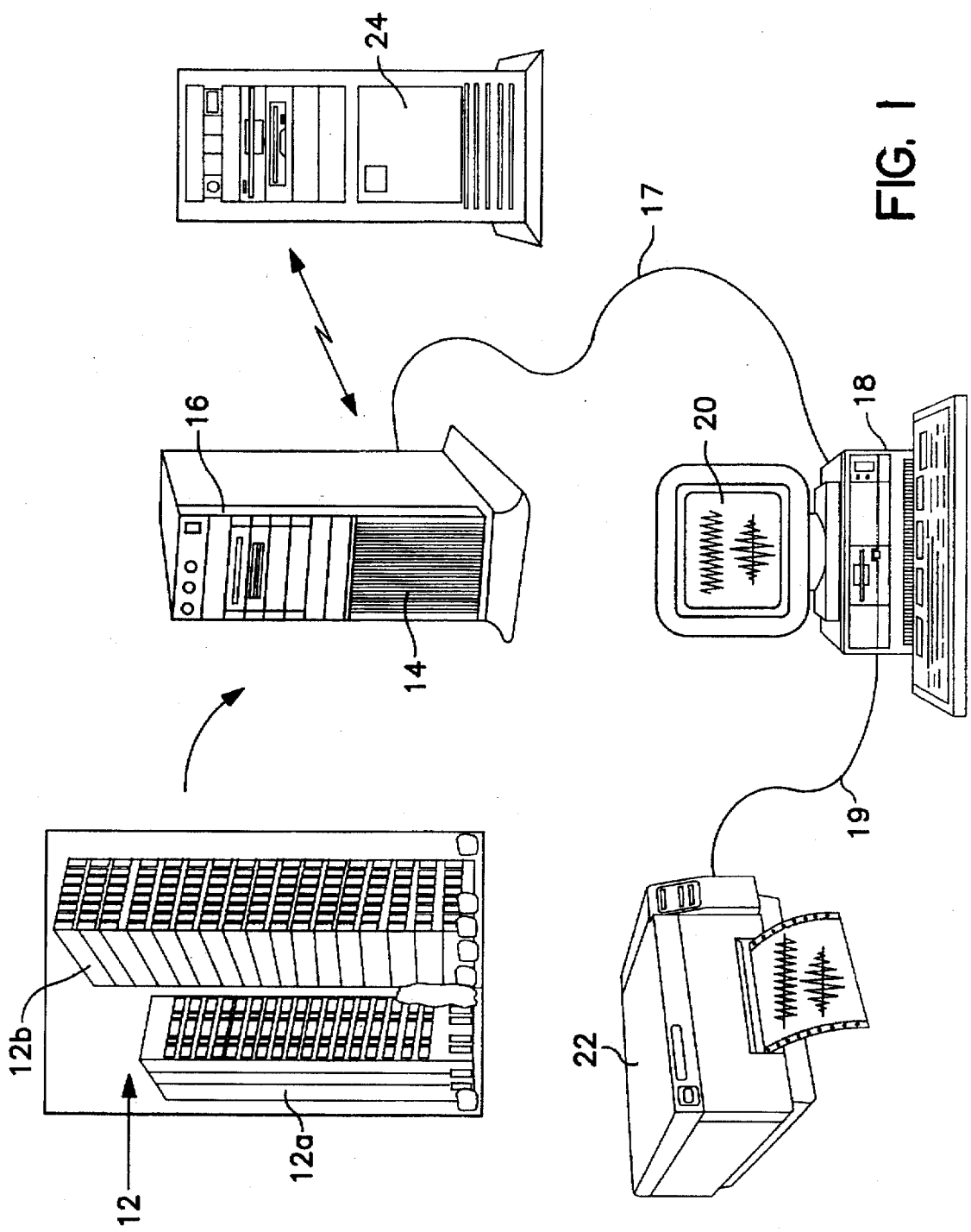
FIG. 1 illustrates process methodology and a system, according to the invention, for storing and accessing information to evaluate selected real estate.

FIG. 1 illustrates real estate 12, shown illustratively as two buildings 12a, 12b, which is under consideration for a selected use by a Business Entity. In accord with the invention, a database 14 stores selected information about the real estate 12 so that the Business Entity can effectively and objectively evaluate the real estate 12. Specifically, the database 14 includes memory section 16, e.g., magnetic or optical disc storage, to store selected information which is processed in accord with the methods described below. The memory section 16 holds information about the real estate 12, including utilization information such as square footage, usage data indicating the selected use, e.g., a rental property, and cost data including a rental price of the real estate 12.

In order to provide an evaluation of the real estate, information about similar business entities and properties are needed. Thus, the memory section 16 also holds utilization values which characterize business entities which are similar to the Business Entity. One manner in which this similarity is determined is by comparing the standard industrial classification codes (SIC) between the Business Entity and other business entities (for example, it is assumed that entities which have the same SIC as the Business Entity are "similar").

The utilization information and values are communicated to the computer 16, via communication line 17, and are processed by the computer 18 to determine a utilization indicator. The utilization indicator has a numerical representation, such as a number, and is a function of the square footage of the real estate 12, the selected use of the real estate 12, the utilization values of the business entities, and the cost data. In accord with the invention, the computer 18 processes the utilization indicator to provide a score evaluating the real estate 12, such as described in greater detail below. The score is then communicated to a Customer of the invention by way of the display 20, printer 22, and/or telephone and/or facsimile and/or modem device.

Preferably, the utilization information specifically includes space utilization information and cost utilization information. Respectively, such information is gathered, in accord with the invention, by accessing and extracting space utilization data records and cost utilization data records from a business database 24, such as but not limited to those commercially available business databases from Dun & Bradstreet™, and/or TRW™, and/or Equifax™. The database 24 can be manually downloaded to the database 14; or, alternatively, the database 24 can be connected for automatic download of selected information to the database 14 on an as-needed basis, such as known to those skilled in the art. For example, information regarding certain submarkets and SIC codes can be imported to the database 14 from the database 24 when such information changes, to reflect the most recent real estate conditions and to provide the most accurate real estate evaluation to a Customer.

The invention preferably generates a score that includes factors other than utilization information. For example, the score—as a minimum—includes utilization information relating to cost and space, and preferably includes information relating to one of grade, area and risk.

Accordingly, the score provides for up to five basic indicators of a company's real estate condition—Amount, Price, Grade, Area and Risk. Preferably, each of the five indicators is scaled for a total potential score of 10, thereby providing an objective evaluation of the real estate for the Business Entity. For example, a score of 5 or below generally highlights the need for the Business Entity's management to focus on real estate issues.

In accord with certain embodiments of the invention, each section below describes in detail the steps including the algorithm for determining a numerical indicator for each of these five indicators. As also described below, the indicators are processed to form a composite score.

Amount

Amount is an indicator of space utilization by a Business Entity of the selected real estate location. The amount evaluation is based primarily on at least one of two measures: (i) the square-footage per employee (SF/Employee) and/or (ii) the sales per square foot (Sales/SF). Higher indicators are assigned to Business Entities with higher than average space utilization for similar entities; and lower indicators are assigned to Business Entities with lower than average space utilization for similar entities.

The preferred data stored in the database to determine the amount includes the square feet and the number of employees for the Business Entity; and the square feet and number of employees for all companies within the SIC codes that are similar to the SIC code of the Business Entity. The source for the space utilization data records is provided by commercially available business databases, in addition to information provided by the Business Entity, such as the number of employees-in the real estate.

According to one embodiment of the invention, the algorithm for calculating amount is as follows. Note that in the embodiment described below, the total amount indicator is broken into a first and second amount indicator:

Steps 1–6 are performed periodically, e.g., monthly or quarterly:

1. Extract records with SIC code, square feet, and number of employees from business database.
2. Calculate Square Feet/Employee for each record extracted.
3. Sort the resulting list of results by SIC code.
4. Calculate the average SF/Employee for each SIC code.
5. Calculate the standard deviation of the distribution of SF/Employee for each SIC code.
6. Develop a list of SIC codes with average SF/Employee and standard deviation for each.

Steps 7–13 are performed for each Business Entity as needed:

7. Extract the Business Entity's SIC code, Square Feet and Employees from the Business Entity record.
8. Calculate the SF/Employee for the Business Entity.
9. Extract the average SF/Employee and standard deviation for the Business Entity's SIC code.
10. Calculate the Business Entity's variance (CV): CV=user SF/Employee-SIC average SF/Employee.
11. If the absolute value of the CV is less than standard deviation (i.e. the variance of most of the business entities in the SIC code), then the Business Entity is near the average, and a numerical representation of a medium score is assigned to the first amount indicator.
12. If the CV is negative and its absolute value is greater than or equal to the standard deviation, then the Business Entity is using space better than the industry average, and a numerical representation of a high score is assigned to the first amount indicator.
13. If the CV is positive and greater than or equal to the standard deviation then the Business Entity's space utilization is lower than the industry average, and a numerical representation of a low score is assigned to the first amount indicator.

Steps 14–19 are performed periodically, e.g., monthly or quarterly:

14. Extract records with SIC code, square feet, and annual sales from business database.
15. Calculate Sales/Square Foot for each record extracted.
16. Sort the resulting list of results by SIC code.
17. Calculate the average Sales/Square Foot for each SIC code.
18. Calculate the standard deviation of the distribution of Sales/Square Foot for each SIC code.
19. Develop a list of SIC codes with average Sales/Square Foot and standard deviation for each.

Steps 20–26 are performed for each Business Entity as needed:

20. Extract the user's SIC code, Square Feet and Annual Sales from the Business Entity record.
21. Calculate the Sales/SF for the Business Entity.
22. Extract the average Sales/SF and standard deviation for the user's SIC code.
23. Calculate the Business Entity's variance (CV): CV=user Sales/SF-SIC average Sales/SF.
24. If the absolute value of the CV is less than standard deviation (i.e. the variance of most of the business entities in the SIC code), then the Business Entity is near the average, and a numerical representation of a median score is assigned to the second amount indicator.
25. If the CV is positive and its absolute value is greater than or equal to the standard deviation, then the Business Entity's space utilization is higher than the industry average, and a numerical representation of a high score is assigned to the second amount indicator.
26. If the CV is negative and greater than or equal to the standard deviation then the Business Entity's space utilization is lower than the industry average, and a numerical representation of a low score is assigned to the second amount indicator.

Steps 27–28 are performed for each Business Entity as needed:

27. The assigned scores for the first and second amount indicators are adjusted by weighting factors.
28. The adjusted first and second amount indicators are combined to determine an overall numerical representation for the total amount indicator.

Price

Price is an indicator of cost utilization at the Business Entity's location. Evaluation is based upon at least one of three measures: (i) Rent/SF, (ii) Rent/Employee, and/or (iii) Rent/Sales. Each of the three measures is evaluated independently, and combined with appropriate weighting factors to determine the total price indicator. Higher indicators are assigned to business entities with higher than average industry real estate cost utilization, and lower indicators are assigned to business entities with lower than average industry real estate costs utilization.

The preferred data stored in the database to determine the price indicator includes the rent, square feet, and sales for the Business Entity, and the rent, square feet, and sales for all companies within the SIC codes that are similar to the SIC code of the Business Entity. The source for the price/cost data records is provided by commercially available business databases, in addition to information provided by the Business Entity.

According to one embodiment of the invention, the algorithm for calculating the price indicator is as follows. Note that in the embodiment described below, the total price indicator is broken into a first, second, third and fourth price indicator:

Steps 1–6 are performed periodically, e.g, monthly or quarterly:
1. Extract all records with SIC code, Square Feet and Rent from the business database.
2. Calculate Rent/Square Feet for each record extracted.
3. Sort the resulting list of results by SIC code.
4. Calculate the average Rent/SF for each SIC code.
5. Calculate the standard deviation of the distribution of Rent/SF for each SIC code.
6. Develop a list of SIC codes with average Rent/SF and standard deviation for each.

Steps 7–13 are performed for each Business Entity as needed:
7. Extract the Business Entity's SIC code, Square Feet and Rent from the data record.
8. Calculate the Rent/SF for the Business Entity.
9. Extract the average SF/Employee and standard deviation for the Business Entity's SIC code.
10. Calculate Business Entity's variance (CV): CV Business Entity's Rent/SF-SIC average Rent/SF.
11. If the absolute value of the CV is less than the standard deviation (i.e. the variance of most of the companies in the SIC code), then the Business Entity's Rent/SF is near the industry average, and a numerical representation of a medium score is assigned to the first price indicator.
12. If the CV is negative and its absolute value is greater than or equal to the standard deviation, then the Business Entity's Rent/SF is lower than the industry average, and a numerical representation of a high score is assigned to the first price indicator.
13. If the CV is positive and greater than or equal to the standard deviation, then the Business Entity's Rent/SF is higher than the industry average, and a numerical representation of a low score is assigned to the first price indicator.

Steps 14–19 are performed periodically, e.g., monthly or quarterly:
14. Extract all records with SIC code, Rent and Employees from the business database.
15. Calculate Rent/Employee for each record extracted.
16. Sort the resulting list of results by SIC code.
17. Calculate the average Rent/Employee for each SIC code.
18. Calculate the standard deviation of the distribution of Rent/Employee for each SIC code.
19. Develop a list of SIC codes with average Rent/Employee and standard deviation for each.

Steps 20–26 are performed for each Business Entity as needed:
20. Extract the Business Entity's SIC code, the number of employees of the Business Entity in the real estate (hereinafter referred to as Employees/This Location), and Rent from the Business Entity's data record.
21. Calculate the Rent/Employee for the Business Entity.
22. Extract the Average Rent/Employee and standard deviation for the Business Entity's SIC code.
23. Calculate Business Entity's (CV): CV=Business Entity's Rent/Employee-SIC Average Rent/Employee.
24. If the absolute value of the CV is less than the standard deviation (i.e. the variance of most of the companies in the SIC code), then the Business Entity's Rent/Employee is near the industry average, and a numerical representation of a medium score is assigned to the second price indicator.
25. If the CV is negative and its absolute value is greater than or equal to the standard deviation, then the Business Entity's Rent/Employee is lower than the industry average; and a numerical representation of a high score is assigned to the second price indicator.
26. If the CV is positive and greater than or equal to the standard deviation, then the Business Entity's Rent/Employee is higher than the industry average; and a numerical representation of a low score is assigned to the second price indicator.

Steps 27–32 are performed periodically, e.g., monthly or quarterly:
27. Extract all records with SIC code, Rent and Sales from the business database.
28. Calculate Rent/Sales for each record extracted.
29. Sort the resulting list of results by SIC code.
30. Calculate the average Rent/Sales for each SIC code.
31. Calculate the standard deviation of the distribution of Rent/Sales for each SIC code.
32. Develop a list of SIC codes with average Rent/Sales and standard deviation for each.

Steps 33–39 are performed for each Business Entity as needed:
33. Extract the Business Entity's SIC code, Rent and Sales from the Business Entity's data record.
34. Calculate the Rent/Sales for the Business Entity.
35. Extract the Average and Rent/Sales for the Business Entity's SIC code.
36. Calculate Business Entity's variance (CV): CV=Business Entity's Rent/Sales-SIC Average Rent/Sales.
37. If the absolute value of the CV is less than the standard deviation (i.e. the variance of most of the companies in the SIC code), then the Business Entity's Rent/Sales is near the industry average, and a numerical representation of a median score is assigned to the third price indicator.
38. If the CV is negative and its absolute value is greater than or equal to the standard deviation, then the Business Entity's Rent/Sales is better than the industry average; and a numerical representation of a high score is assigned to the third price indicator.
39. If the CV is positive and greater than or equal to the standard deviation, then the Business Entity's Rent/Sales is higher than the industry average; and a numerical representation of a low score is assigned to the third price indicator.

Steps 40–41 are performed periodically, e.g. monthly or quarterly:
40. Extract Average Rent/SF for each property type within each submarket from an external Submarket Database.
41. Develop a list of average Rent/SF for each property type within each submarket.

Steps 42–49 are performed for each Business Entity as needed:
42. Extract the Business Entity's SIC code, Square Feet and Rent from the Business Entity's data record.
43. Determine Business Entity's property type from SIC code and/or other available data sources, and Submarket from address.
44. Calculate the Rent/SF for the Business Entity.
45. Extract the Rent/SF for Business Entity's property type from Submarket Rent/SF list.
46. Calculate variance between Business Entity's Rent/SF and Submarket Rent/SF.
47. If the variance is less than a threshold (to be developed empirically) of the average Submarket Rent/SF, then the Business Entity's Rent/SF is near the submarket average, and a numerical representation of a medium score is assigned to the fourth price indicator.

48. If the CV is negative and greater than or equal to a threshold (to be developed empirically) of the average Submarket Rent/SF, then the Business Entity's Rent/SF is lower than the submarket average; and a numerical representation of a high score is assigned to the fourth price indicator.

49. If the CV is positive and greater than or equal to a threshold (to be developed empirically) of the average Submarket Rent/SF, then the Business Entity's Rent/SF is higher than the submarket average; and a numerical representation of a low score is assigned to the fourth price indicator.

Steps 50–51 are performed for each Business Entity as needed:

50. The assigned scores for the first, second, third and fourth price indicators are adjusted by weighting factors.

51. The adjusted first, second, third and fourth price indicators are combined to determine the total price indicator.

Grade

Grade is an indicator of the quality of facility for the selected real estate location. Evaluation is preferably based on generally accepted classification systems. Building grade is less important than price and amount; therefore it is not weighted as heavily. A higher grade indicator is not rewarded for space that is of a significantly higher grade than industry average, because of the uncertain value of such higher quality space (e.g. occupying Class A space when industry practice is to occupy Class C space).

The preferred data stored in the database to determine the grade includes building addresses, and building classifications for such buildings, and other information relevant to practice within the SIC/Industry. Information for the grade data records is provided, for example, by real estate data vendors, available business databases, the U.S. Postal Service and by On-Site Inspectors, in addition to information provided by the business entity.

According to one embodiment of the invention, the algorithm for calculating grade is as follows:

Steps 1–11 are performed periodically, e.g. quarterly or annually:

1. Develop listing of commercial building addresses in a market from a business database or external source, such as the U.S. Postal Service the phone company, and real estate data vendors.
2. Select a sample of buildings for survey. Sample size is contingent on resources/time available for survey.
3. Using a variety of sources, including direct inspection, real estate professionals or real estate data vendors, assign, 2 or 3 a numerical representation of a uniform grade to each building based upon the generally accepted classification systems. Update the electronic list of addresses with grades.
4. Extrapolate a grade to each building on the list that was not surveyed based on grades of surrounding surveyed buildings.
5. Develop a list of addresses and grades.
6. Extract from the business database all companies/records with addresses that match the address/grade list.
7. Assign each extracted record a building grade based on the grade assigned to its address.
8. Sort company records by SIC code.
9. Calculate average building grade by SIC Code.
10. Calculate standard deviation by SIC Code.
11. Develop a list of SIC codes with average building grade and standard deviation for each.

The following steps 12–18 are performed for each Business Entity as needed:

12. Extract the Business Entity's building grade and SIC code from the Business Entity's data record. If the building grade was not surveyed as part of the periodic review in step 3 above then proceed to step 13 below; or else proceed to step 14 below.
13. Inspect the Business Entity's real estate and assign a building grade. Update the Business Entity's data record and the address/grade list for inspection, as well as any other company records for that address.
14. Extract the average building grade and the standard deviation of the distribution of building grade for the Business Entity's SIC code.
15. Calculate Business Entity's variance (CV): CV=Business Entity's building grade-SIC average building grade.
16. If the absolute value of the CV is less than the standard deviation (i.e. the variance of most of the companies in the SIC code), then the Business Entity is near the average; and a numerical representation of a median score is assigned to the grade indicator.
17. If the CV is positive and greater than or equal to the standard deviation, then the Business Entity is in a higher grade building than industry' average; and a numerical representation of a high score is assigned to the grade indicator.
18. If the CV is negative and its absolute value is greater than or equal to the standard deviation, then the Business Entity occupies a facility that is lower in grade than the industry practice; and a numerical representation of a low score is assigned to the grade Area Area is an indicator of the economic attractiveness of the submarket in which the Business Entity is located. Evaluation (Submarket Ranking) is based on Rents, Vacancy and Absorption rates, transportation and infrastructure measures, demographic profiles, and other objective and subjective measures of submarket attractiveness. Area is less important than Amount and Price and is not weighted as heavily. As with grade, a higher area indicator is not rewarded for submarkets that are of a significantly higher rating than industry average, because of the uncertain value of such higher quality locations.

The preferred data stored in the database to determine the area indicator includes Submarket Rent/SF, Vacancy %, Absorption Rate, Building addresses, and Submarket conditions data. The source for the data records supporting the area indicator determination is provided by real estate data vendors, Market data, Submarket Review, and commercially available business databases, in addition to information provided by the Business Entity.

According to one embodiment of the invention, the algorithm for calculating area is as follows:

Steps 1–4 are performed periodically, e.g. quarterly or annually:

1. Define and Develop list of submarkets for each Market.
2. Calculate Rent/SF, Vacancy % and Annual Absorption Rate for each Submarket within a Market.
3. Rank, according to each SIC code, each Submarket relative to other Submarkets within its Market by evaluating the Submarket's attractiveness based on at least one of the following measures: Rent/SF, Vacancy %, Annual Absorption Rate, transportation and infrastructure measures, demographic profiles and other objective and subjective measures.
4. Develop a list of SIC codes, Submarkets and Submarket Rankings.

Determine the Median Ranking for each Market and SIC code.

Steps 5–10 are performed for each Business Entity as needed:

5. Extract the Business Entity's Submarket name and SIC code from the Business Entity data records.
6. Extract the Business Entity's Submarket Ranking and the Median Market Ranking for the business entity's SIC code.
7. Calculate the Business Entity's variance (CV): CV=Business Entity Submarket Ranking-median Market Ranking.
8. If the CV is less than a threshold (to be determined empirically) of the submarket rankings, then the Business Entity is near the average; and a numerical representation of a medium score is assigned to the area indicator.
9. If the CV is positive and is greater than or equal to a threshold (to be determined empirically) of the submarket rankings, then the Business Entity is in a stronger submarket than industry average; and a numerical representation of a high score is assigned to the area indicator.
10. If the CV is negative and its absolute value is greater than a threshold (to be determined empirically) of the submarket rankings, then the Business Entity's submarket is economically weaker than the industry average; and a numerical representation of a low score is assigned to the area indicator.

Risk

Risk is an indicator of the financial, market and environmental exposure of the Business Entity in owning and/or leasing and/or using the real estate at the location. Evaluation is based on at least one of (i) the location's proximity to naturally occurring and man-made environmental hazards, such as toxic waste sites and radon sites as registered with the Environmental Protection Agency (EPA); (ii) other hazardous indicators, such as asbestos exposure, or building age for determining asbestos exposure, if the presence of asbestos in a real estate is uncertain; (iii) the tenancy status of the Business Entity in the real estate in comparison to other business entities within a similar SIC code; (iv) the financial encumberances of the Business Entity for the real estate; and (v) other measures that indicate the financial, market and/or environmental risks associated with the real estate.

The preferred data stored in the database to determine the area includes, for example, the building age, environmental sites, radon exposure and sites, tenancy status and financial encumberances of the real estate. The source for the data records supporting the risk indicator determination is provided by databases including building age, zip code, environmental sites, radon sites, and the EPA, in addition to information provided by the Business Entity.

According to one embodiment of the invention, the algorithm for calculating a risk indicator is as follows(Note that in the embodiment described below, the total risk indicator is broken into a first, second, third and fourth risk indicator):

Steps 1 and 2 are performed periodically, e.g. quarterly or annually:

1. Develop a list of addresses or address codes that contain EPA registered Toxic Waste sites from government published sources.
2. Develop a list of addresses or address codes that contain EPA registered Radon sites from government published sources.

Steps 3–12 performed for each Business Entity as needed:

3. Extract the Business Entity's address or address code and building age from the Business Entity's data record.
4. Using an appropriate geographic measurement system, such as Zip Codes or Geocoding, determine the distance between the nearest Toxic Waste site address and the Business Entity's address or address code.
5. If the distance is greater than a threshold (to be developed empirically) of the safe distance, then the Business Entity is not significantly exposed to toxic waste risks; and a numerical representation of a high score is assigned to the first risk indicator.
6. If the distance is smaller than a threshold (to be developed empirically) of the safe distance, then the Business Entity may be exposed to toxic waste risks; and a numerical representation of a low score is assigned to the first risk indicator.
7. Using an appropriate geographic measurement system, such as Zip Codes or Geocoding, determine the distance between the nearest Radon site address and the Business Entity's address or address code.
8. If the distance is greater than a threshold (to be developed empirically) of the safe distance, then the Business Entity is not significantly exposed to Radon risks; and a numerical representation of a high score is assigned to the second risk indicator.
9. If the distance is smaller than a threshold (to be developed empirically) of the safe distance, then the Business Entity may be exposed to Radon risks; and a numerical representation of a low score is assigned to the second risk indicator.
10. If the real estate at the location is known not to contain Asbestos, or if the real estate at the location was built or last renovated before 19XX (a year dependent upon state codes, and local building practices relevant to the location of the real estate), then it probably does not contain asbestos; and a numerical representation of a high score is assigned to the third risk indicator.
11. If the real estate at the location was built or last renovated after 19YY, then it probably does not contain asbestos; and a numerical representation of a high score is assigned to the third risk indicator.
12. If the building is known to contain asbestos, or if the building was constructed or last renovated after 19XX but before 19YY (a period of years when local conditions mandated extensive use of asbestos materials), then it may contain asbestos; and a numerical representation of a low score is assigned to the third risk indicator.

Steps 13–15 are performed periodically, e.g. monthly or quarterly:

13. Extract all records with SIC code and tenancy status from the business database.
14. Calculate the majority tenancy status for each SIC code (i.e. for each SIC code, determine whether most business entities own real estate or lease real estate).
15. List the majority tenancy status for each SIC code.

Steps 16–21 are performed for each Business Entity as needed:

16. Extract the Business Entity's SIC code, tenancy status, and encumberances.
17. Extract the majority tenancy status for the Business Entity's SIC code from the list developed in step 16.
18. If the Business Entity's tenancy status for the real estate is as a lessee, then the Business Entity is deemed not to be exposed to financial risk for the real estate, and a numerical representation of a high score is assigned to the fourth risk indicator.
19. If the Business Entity's tenancy status for the real estate is as an owner, and the majority tenancy status for the Business Entity's SIC code is as a lessee, then the Business Entity is deemed to be exposed to financial risk for the real estate and a numerical representation of a low score is assigned to the fourth risk indicator.

20. If the Business Entity's tenancy status for the real estate is as an owner, the majority tenancy status for the Business Entity's SIC code is as an owner, and the real estate of the Business Entity is not encumbered, then the Business Entity is deemed to have limited exposure to financial risk for the real estate, and a numerical representation of a high score is assigned to the fourth risk indicator.

21. If the Business Entity's tenancy status for the real estate is as an owner, the majority tenancy status for the Business Entity's SIC code is as an owner, and the real estate of the Business Entity is encumbered, then the Business Entity is deemed to be exposed to financial risk for the real estate, and a numerical representation of a low score is assigned to the fourth risk indicator.

Steps 22–23 are performed for each Business Entity as needed:

22. The assigned scores for the first, second, third and fourth risk indicators are adjusted by weighting factors.

23. The adjusted first, second, third and fourth risk indicators are combined to determine the total risk indicator.

Figure 2:
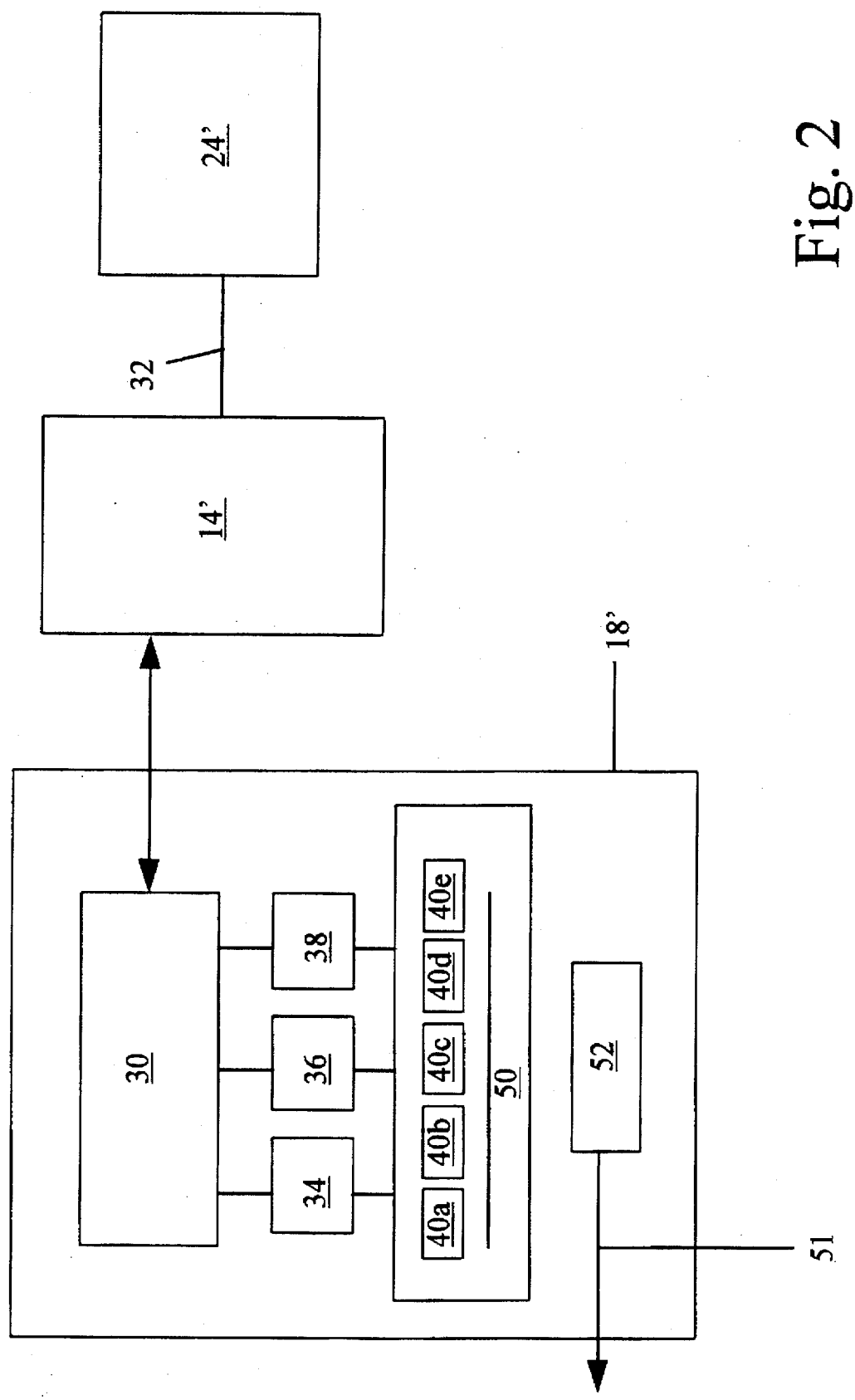
FIG. 2 illustrates apparatus for processing and converting request signals and information into signals representative of an evaluation of real estate, in accord with the invention.

FIG. 2 illustrates a system constructed according to the invention for polling and processing certain of the information stored in a database to provide real estate evaluations as described herein. Specifically, the database 14' stores information which can be processed in accord with the several real estate indicators of real estate condition—amount, price, grade area and risk. A computer 18' includes a microprocessor subsection 30 which (i) accepts and interprets signals representing commands from a user at the computer 18' and which (ii) polls for information from the database 14' in response to the command signals. If the desired information is not within the database 14', the subsection 30 polls for the information from the business database 24'. The communication between the two databases 14' and 24' can be accomplished through various communication networks, including cabling 32, or other means, such as modems, telephone lines and the like.

The subsection 30 thus responds to user command inputs and generates polling signals to the database 14'. The user inputs typically correspond to information about the Business Entity and the real estate, such as the location and SIC code of the Business Entity. Preferably, for any given transaction, information about the Business Entity is stored in memory element 34; and such information typically includes the name of the Business Entity, the number of employees of the Business Entity in the real estate and/or the sales expected or generated in the real estate, and the type of business run by the Business Entity in the real estate 12.

Once the appropriate polling signals are generated to the database 14', information is collected from the database 14' and transferred back to the subsection 30 for internal storage in the computer's memory element 36. This transferred information typically includes information about the real estate, such as its location, geographic vicinity, submarket, market, and the other specific information detailed above and associated with the real estate indicators.

The subsection 30 also generates request signals to the database 14' for informational data records about Business Entities which are similar to the Business Entity. These request signals can be manually input to the computer via Customer inputs, or, preferably, the request signals are automatically generated as a function of information stored in memory element 34. For example, once the location and the type of business is loaded into memory 34, the computer 18' can be programmed to determine the SIC code of the business; and thus the request signals can include a request for information about similar business entities based upon at least one signal which identifies the SIC code.

Informational data records about the similar business entities is likewise stored in memory element 38. Each record, corresponding to one real estate of each of the entities (the term "one real estate" is used to denote one particular real estate, other than the specific real estate under investigation, that is used, owned, or otherwise occupied by one of the business entities that is similar to the Business Entity), includes information about utilization values for space and cost utilization. Accordingly, space utilization information preferably includes square footage per employee, and sales or revenue of the Business Entity in the real estate; while cost utilization information preferably includes the number of employees occupying the real estate, the square footage, the rental costs, and the sales or revenue of the Business Entity in the real estate per rental price of the real estate.

Information within the memory elements 34, 36, 38 is processed by process actuators 40a–40e to determine the indicators as described above: actuator 40a processes signals representative of amount information to determine and generate an amount indicator signal; process actuator 40b processes signals representative of cost information to determine and generate a cost (or price) indicator signal; process actuator 40c processes signals representative of grade information to determine and generate a grade indicator signal; process actuator 40d processes signals representative of area information to determine and generate an area indicator signal; and process actuator 40e processes risk information to determine and generate a risk indicator signal.

A score process section 50 combines the several indicator signals from the actuators 40a–40e to process and generate a score signal, which is representative of the score information as described herein. The score signal is then transmitted to a display/print manager 52 which converts the score signal to information readable to a human or electronic user and transmits such readable information via communication line 51 to a display, e.g., the display 20 of FIG. 1, or to a printer, e.g., the printer 22 of FIG. 1, to communicate the score to a user. Preferably, the score and other information concerning the score indicators, including real estate factors, measures, and ratios, are provided to the Customer at a printer or a facsimile device to provide a hard copy report detailing and summarizing the analysis of the particular real estate.

It is important to note that not all indicators, and hence actuators 40a–40e, are needed to produce a score for use by a Customer. For example, the utilization indicator signal can be processed only from selected information relating to space (i.e., amount) utilization and cost (i.e., price) utilization indicators. In such a case, the process section 50 processes the space and cost utilization indicator signals to generate a score from only the measures of cost and space. (i.e., price) utilization indicators. In such a case, the process section 50 processes the space and cost utilization indicator signals to generate a score from only the measures of cost and space.

The system will produce various reports, enabling empirical data analysis for system upgrade, marketing and other uses to be determined (e.g. derivative products).

It is also important to note that the process may be applied to a portfolio of multiple real estate facilities to generate a "portfolio score" in addition to a score for a real estate comprised of a single location.

The process flow, algorithms, and calculations for determining the several indicators—are described in more detail below and in connection with FIGS. 3–21.

Figure 3:
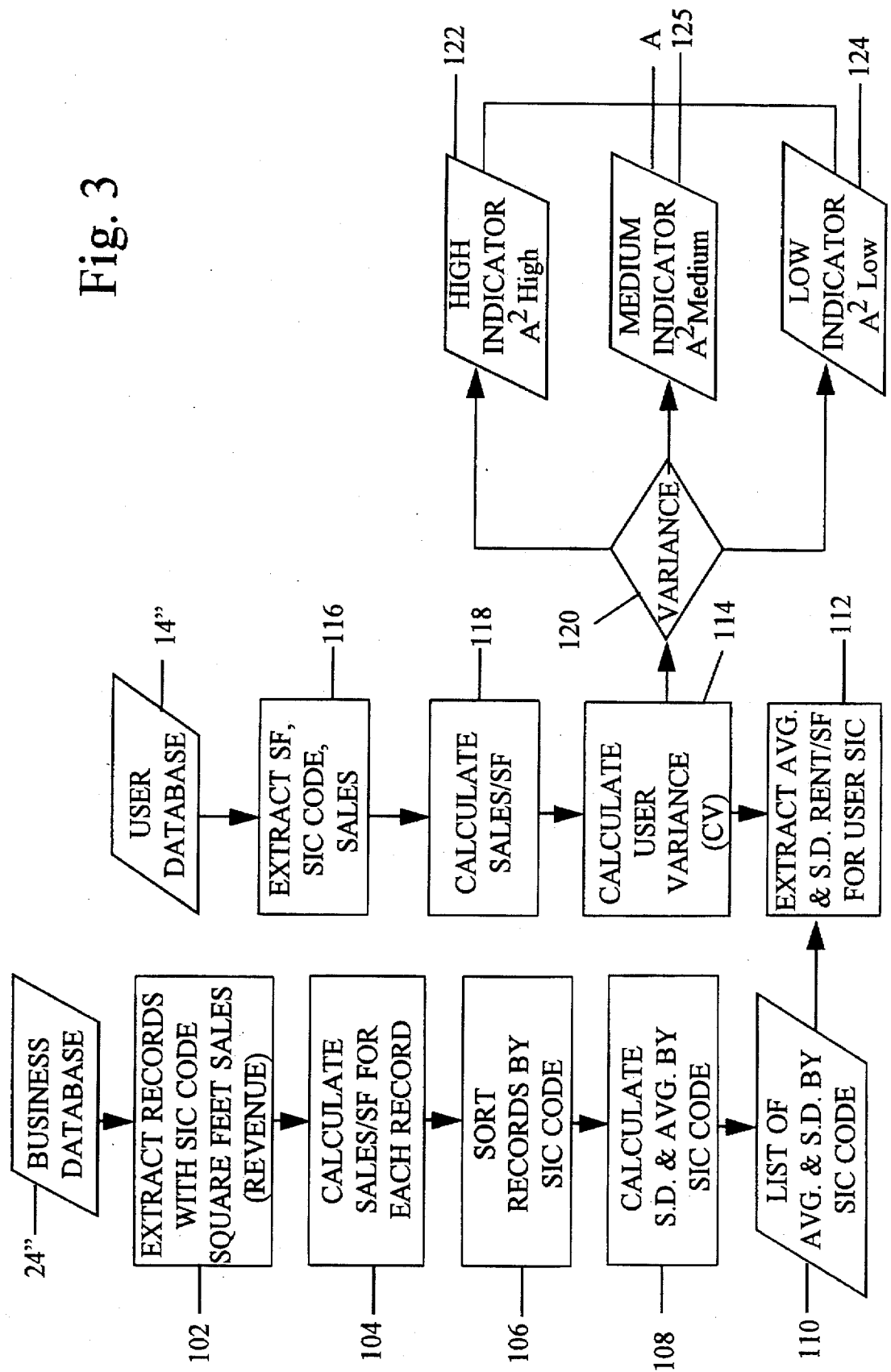
FIGS. 3–21 show process flow methodology, according to the invention, for determining factors, measures, ratios, and other real estate indicators for use in determining real estate condition and situation.

FIG. 3 represents a process flow chart for determining the amount indicator for a use corresponding to sales per square foot. As above, a business database 2" provides records 102 including an SIC code, square feet and sales (revenue) information. This information is processed (block 104) to calculate the sales per square foot for each record, sorted (block 106) by SIC code, and processed (block 108) to calculate the standard deviation and average of the records by SIC code. Thereafter, a list is generated (block 110) to provide an average and standard deviation for each SIC code. One or more entries of standard deviation and average from the list are selected (block 112) to correspond to the SIC code of the Business Entity.

The database 14" likewise provides information about the Business Entity. Specifically, the database 14" provides records 116 including square footage of the real estate, the SIC code of the Business Entity, and the sales (expected or actual) of the Business Entity in the real estate. This information is processed (block 118) to calculate the sales per square foot in the real estate.

The information processed from database 24" and database 14" is combined (block 114) to calculate the variance. The variance is compared (block 120) to determine whether to assign a high (block 122), medium (block 125), or low (block 124) indicator value "A" to the amount. This value "A" is input and further processed as indicated in the several figures below.

Figure 4:
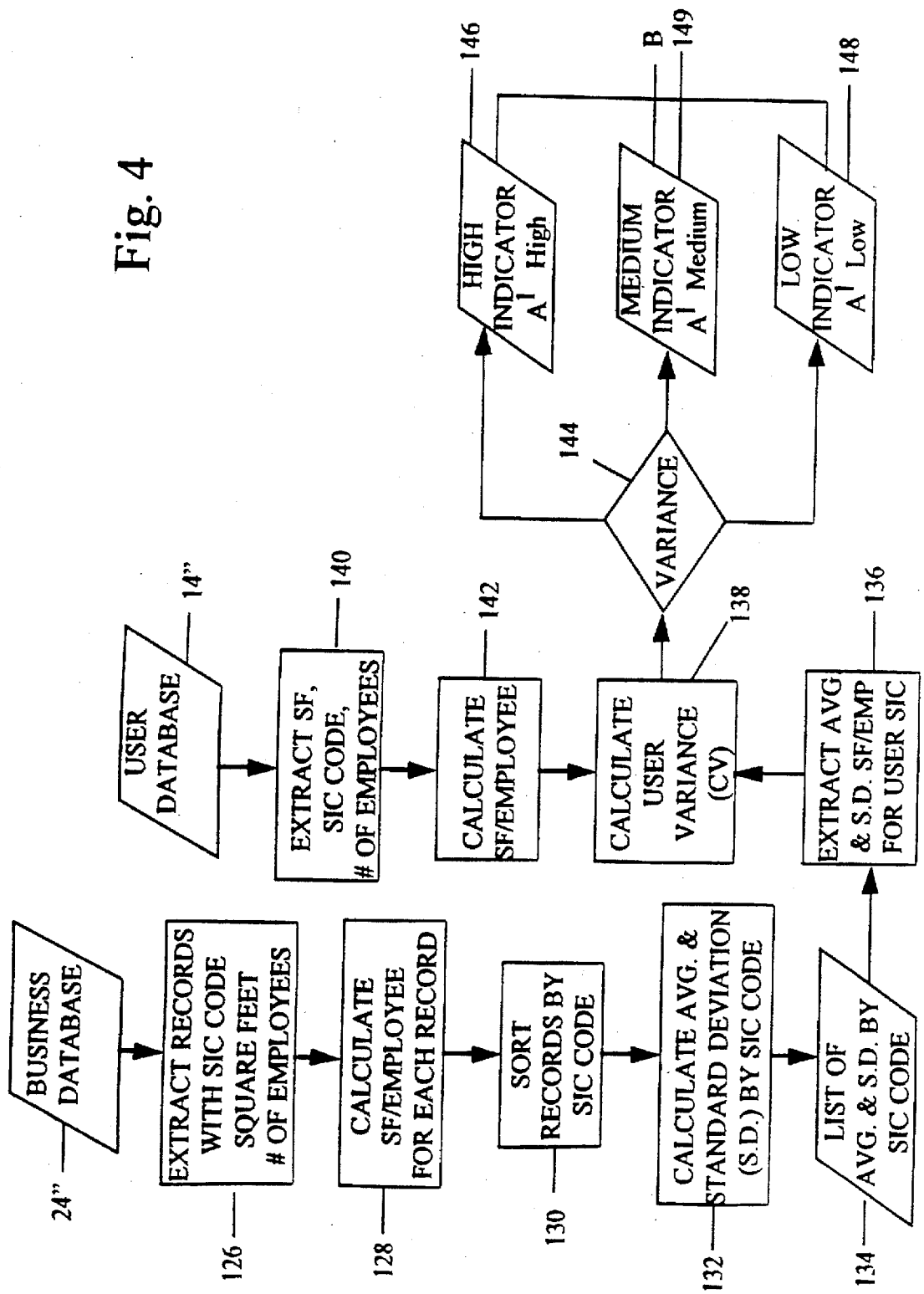

FIG. 4 represents a process flow chart for determining the amount indicator for a use corresponding to square feet per employee. As above, a business database 24" provides records (block 126) including an SIC code, square feet and number of employees. This information is processed (block 128) to calculate the square foot per employee for each record, sorted (block 130) by SIC code, and processed (block 132) to calculate the standard deviation and average of the records. Thereafter, a list is generated (block 134) to provide an average and standard deviation for each SIC code. One or more entries of standard deviation and average from the list are selected (block 136) to correspond to the SIC code of the Business Entity.

The database 14" likewise provides information about the Business Entity. Specifically, the database 14" provides records (block 140), including square footage of the real estate, the SIC code of the Business Entity, and the number of employees of the real estate. This information is processed (block 142) to calculate the square foot per employee at the real estate.

The information processed from database 24" and database 14" is combined (block 138) to calculate the variance. The variance is compared (block 144) to determine whether to assign a high (block 146), medium (block 149), or low (block 148) indicator value "B" to the amount. This value "B" is input and further processed as indicated in the several figures below.

Figure 5:
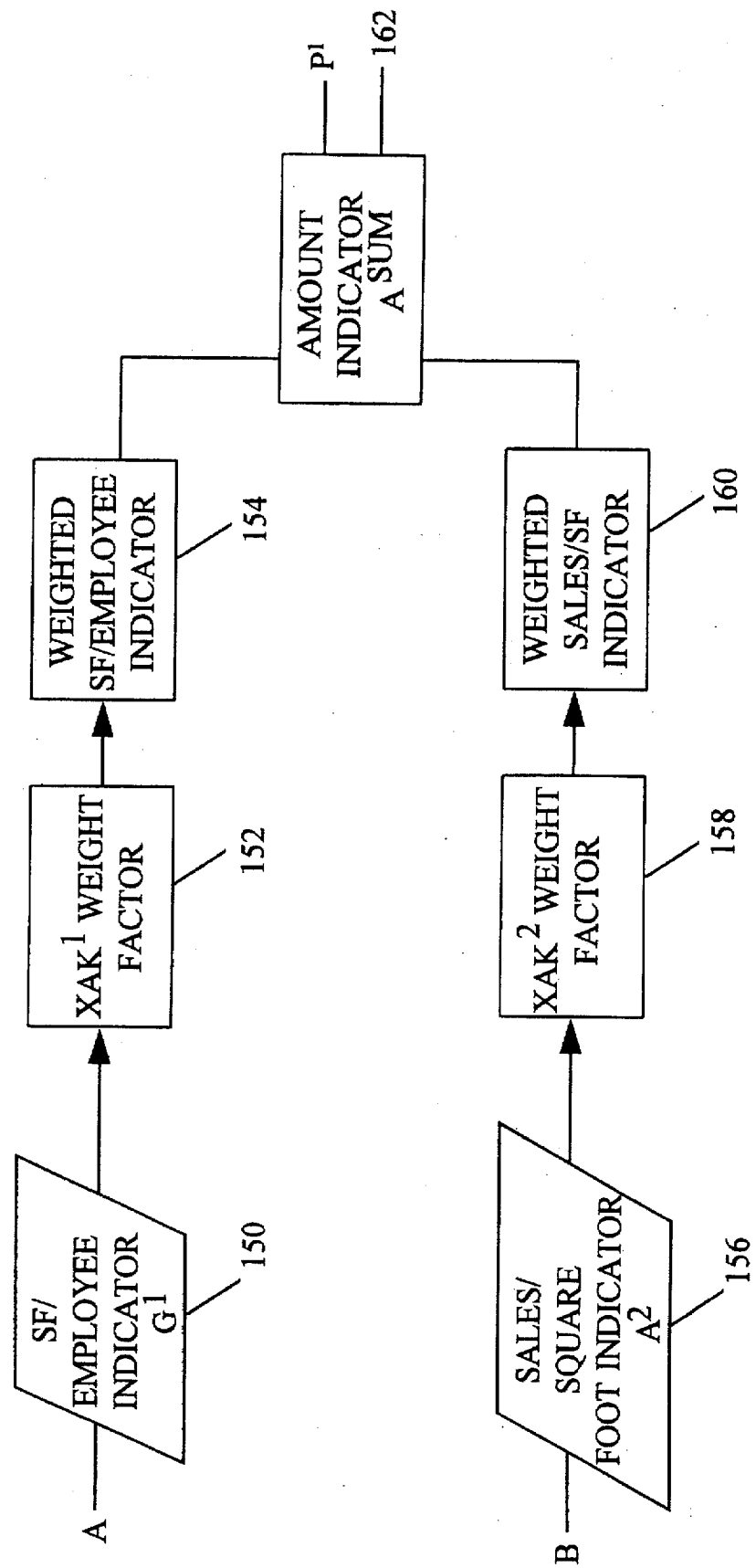

FIG. 5 represents a process flow chart for determining the total amount indicator from the two uses illustrated in the process flow charts of FIGS. 3 and 4. The value "A," from FIG. 3, is input (block 150), weighted (block 152) to produce a weighted indicator (block 154) that is added to a similarly processed "B" input, from FIG. 4. Thus "B" is input (block 156), weighted (block 158) to produce a weighted indicator (block 160) based upon sales per square foot. The two weighted values of blocks 154 and 160 are combined to produce the total amount indicator (block 162), which is output and denoted as "P1."

Figure 6:
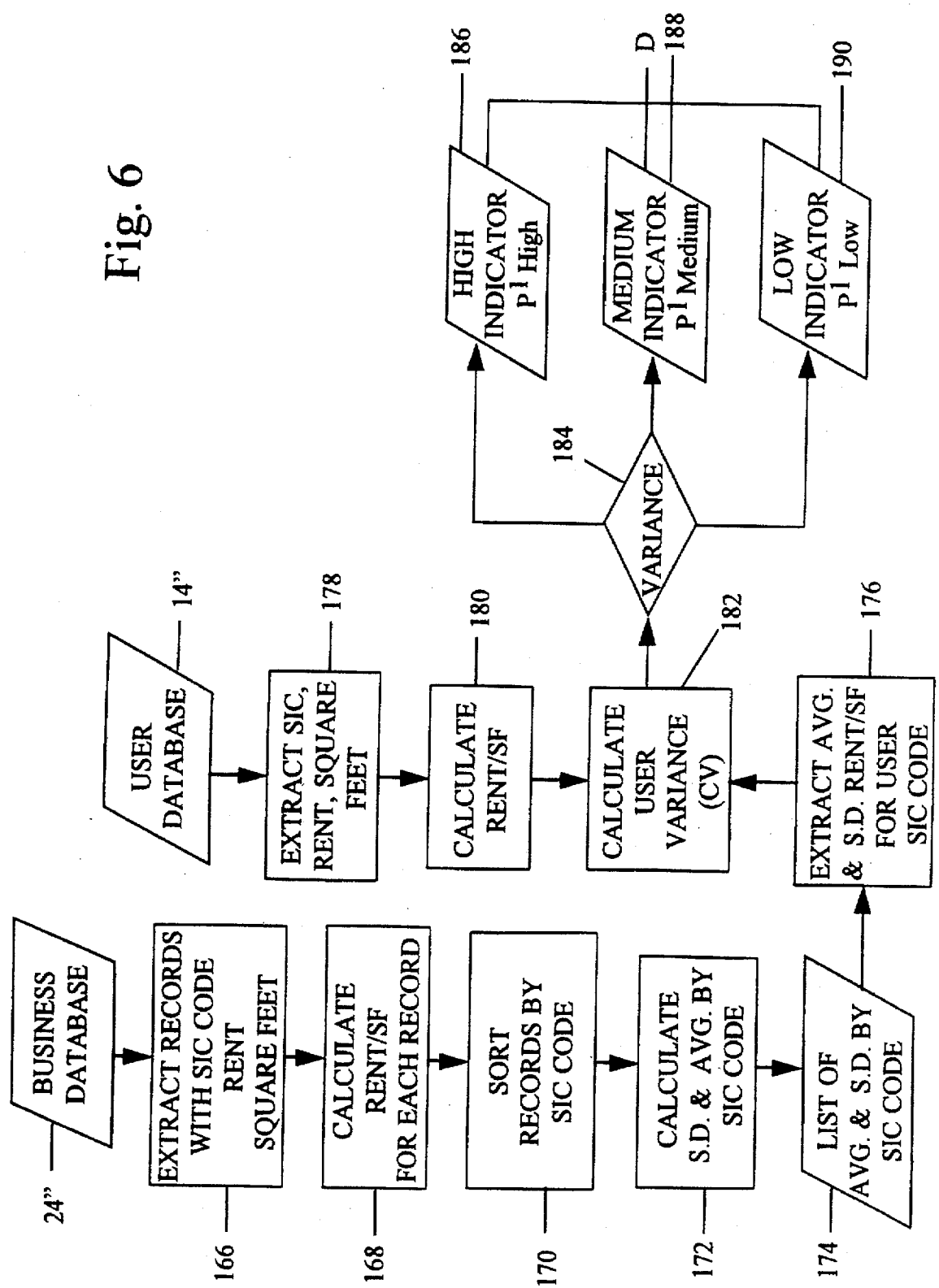

FIG. 6 represents a process flow chart for determining the price indicator for a use corresponding to rent per square foot. A business database 24" provides records 166 including an SIC code, square feet and rent information. This information is processed (block 168) to calculate the rent per square foot for each record, sorted (block 170) by SIC code, and processed (block 172) to calculate the standard deviation and average of the records by SIC code. Thereafter, a list is generated (block 174) to provide an average and standard deviation for each SIC code. One or more entries of standard deviation and average from the list are selected (block 176) to correspond to the SIC code of the Business Entity.

The database 14" likewise provides information about the Business Entity. Specifically, the database 14" provides records (block 178), including square footage of the real estate, the SIC code of the Business Entity, and the rent of the real estate. This information is processed (block 180) to calculate the rent per square foot at the real estate.

The information processed from database 24" and database 14" is combined (block 182) to calculate the variance. The variance is compared (block 184) to determine whether to assign a high (block 186), medium (block 188), or low (block 190) indicator value "D" to the amount. This value "D" is input and further processed as indicated in the several figures below.

Figure 7:
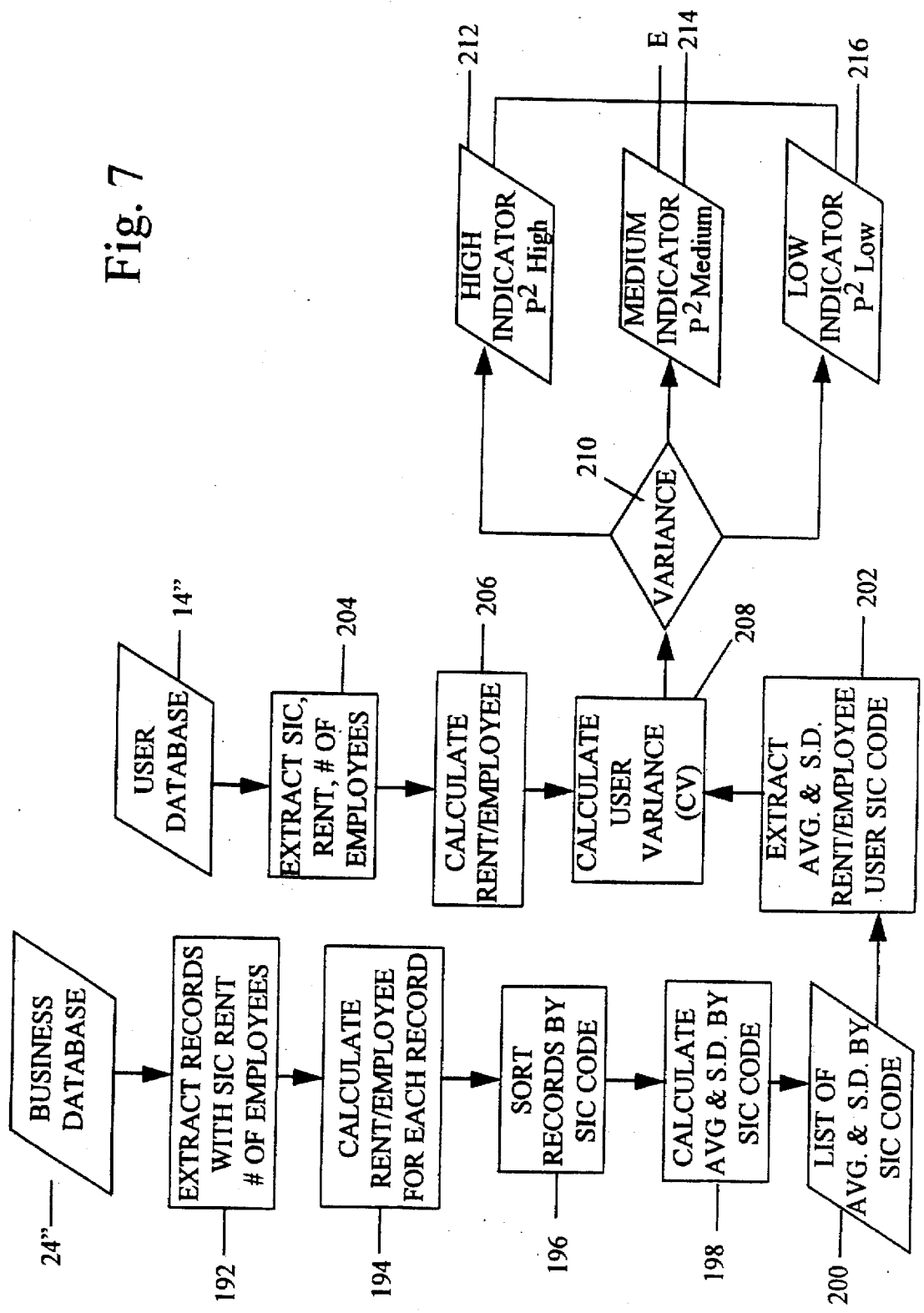

FIG. 7 represents a process flow chart for determining the price indicator for a use corresponding to rent per employee. As above, a business database 24" provides records (block 192), including an SIC code, rent and number of employees. This information is processed (block 194) to calculate the rent per employee for each record, sorted (block 196) by SIC code, and processed (block 198) to calculate the standard deviation and average of the records. Thereafter, a list is generated (block 200) to provide an average and standard deviation for each SIC code. One or more entries of standard deviation and average from the list are selected (202) to correspond to the SIC code of the Business Entity.

The database 14" provides information about the Business Entity. Specifically, the database 14" provides records 204, including rent of the real estate, the SIC code of the Business Entity, and the number of employees of the real estate. This information is processed (block 206) to calculate the rent per employee at the real estate.

The information processed from database 24" and database 14" is combined (block 208) to calculate the variance. The variance is compared (block 210) to determine whether to assign a high (block 212), medium (block 214), or low (block 216) indicator value "E" to the amount. This value "E" is input and further processed as indicated in the several figures below.

Figure 8:
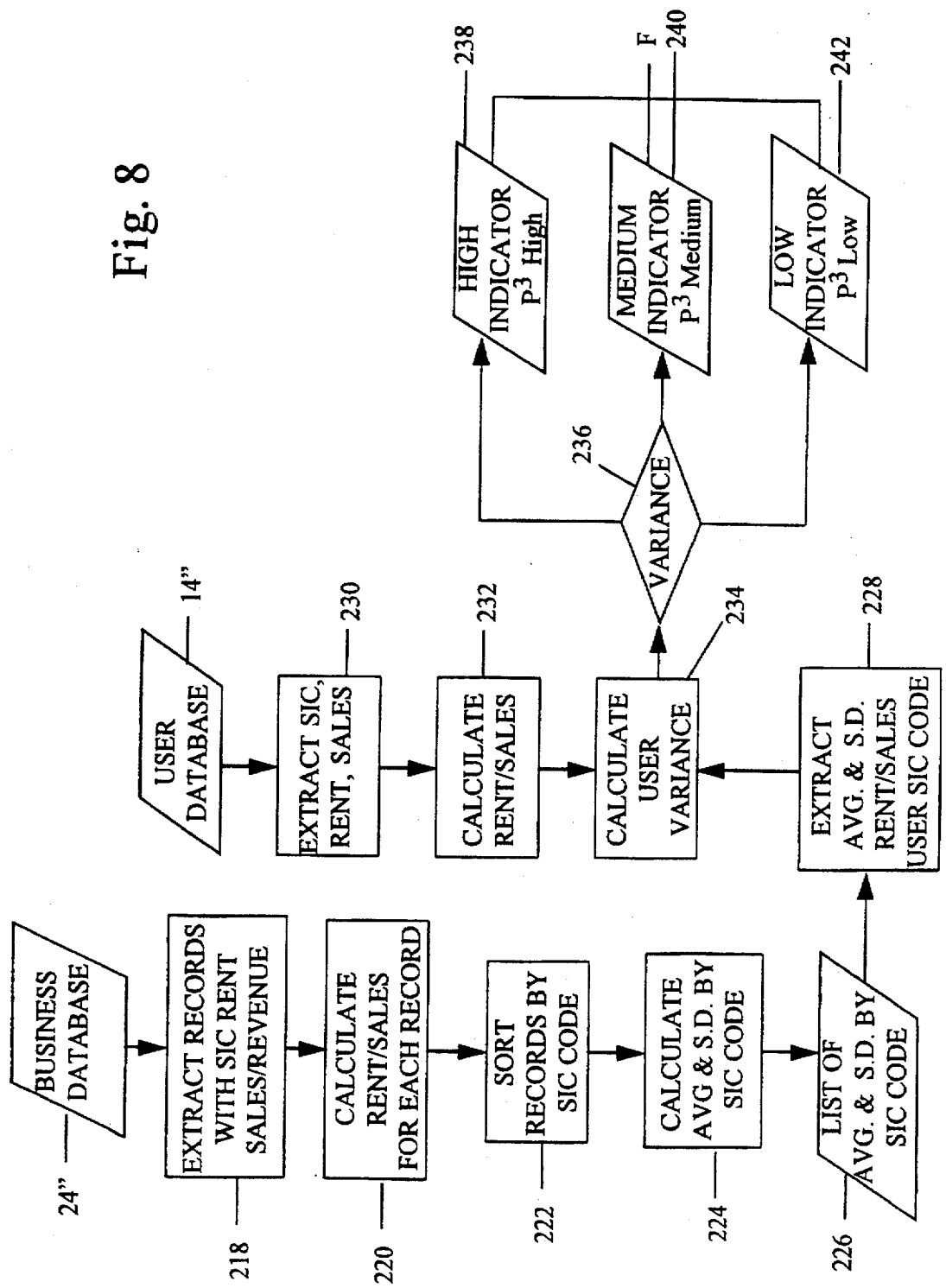

FIG. 8 represents a process flow chart for determining the price indicator for a use corresponding to rent per sales. As above, a business database 24" provides records (block 218) including an SIC code, rent and number of employees. This information is processed (block 220) to calculate the rent per sales for each record, sorted (block 222) by SIC code, and processed (block 224) to calculate the standard deviation and average of the records. Thereafter, a list is generated (block 226) to provide an average and standard deviation for each SIC code. One or more entries of standard deviation and average from the list are selected (block 228) to correspond to the SIC code of the Business Entity.

The database 14" likewise provides information about the Business Entity. Specifically, the database 14" provides records (block 230), including rent of the real estate, the SIC code of the Business Entity, and the sales of the Business Entity in the real estate. This information is processed (block 232) to calculate the rent per sales at the real estate.

The information processed from database 24" and database 14" is combined (block 234) to calculate the variance. The variance is compared (block 236) to determine whether to assign a high (block 238), medium (block 240), or low (block 242) indicator value "F" to the amount. This value "F" is input and further processed as indicated in the several figures below.

Figure 9:
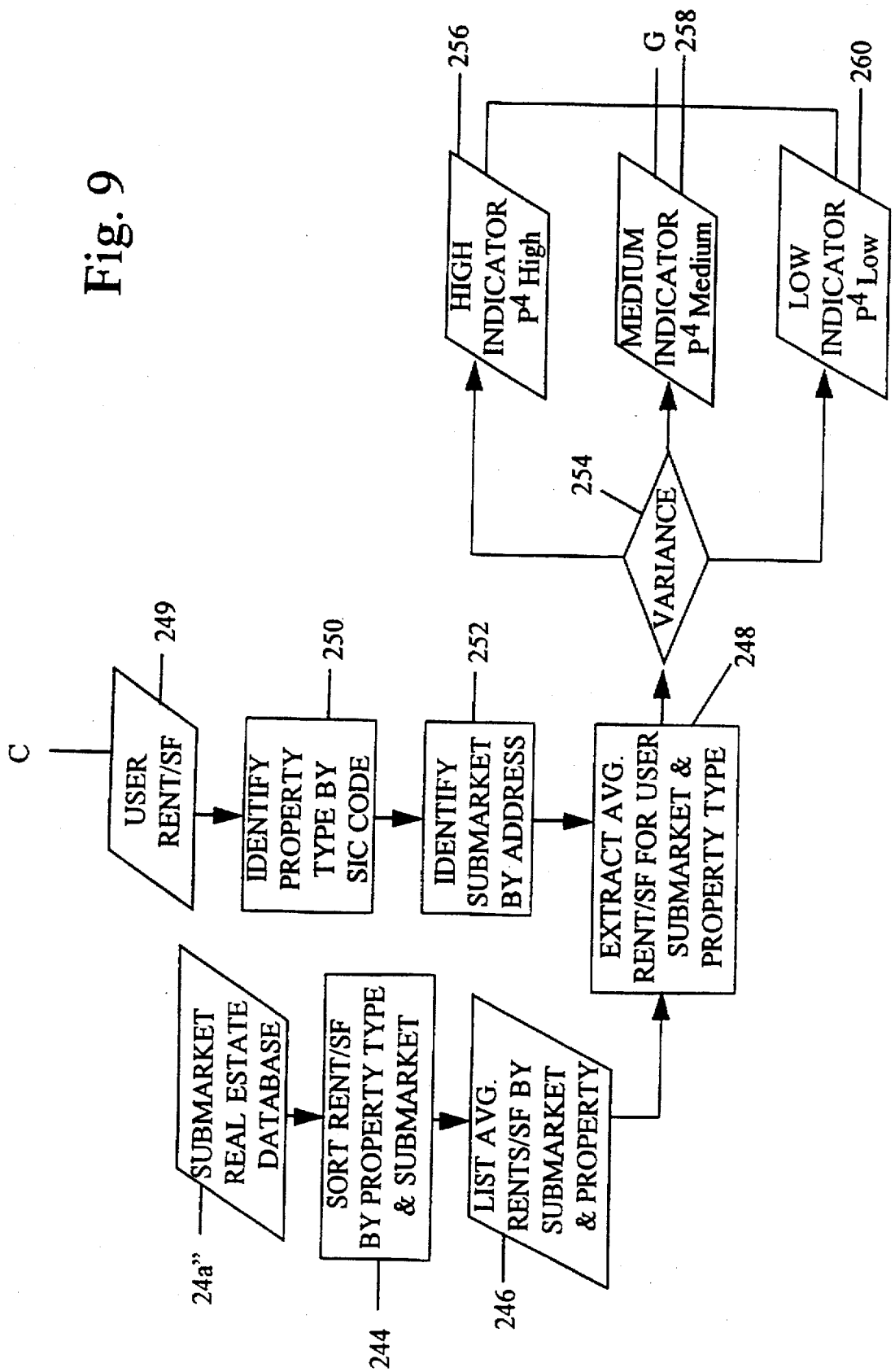

FIG. 9 represents a process flow chart for determining the price indicator for a use corresponding to rent per square foot in a submarket. A business submarket database 24a" provides records which are processed (block 244) to calculate the rent per square foot by property type and submarket. Thereafter, a list is generated (block 246) to provide an average rent per square foot by submarket and property type. One or more of the entries from the list are selected (block 248) to correspond to the Business Entity, as described below.

The input "C" from FIG. 6 provides information about the Business Entity relating to rent per square foot. "C" is input into FIG. 9 (block 249) to identify property type by SIC code (block 250), and to identify the submarket by address (block 252).

The information processed from database 24a" and input "C" is combined and compared (block 254) to determine whether to assign a high (block 256), medium (block 258), or low (block 260) indicator value "G" to the amount. This value "G" is input and further processed as indicated in the several figures below.

Figure 10:
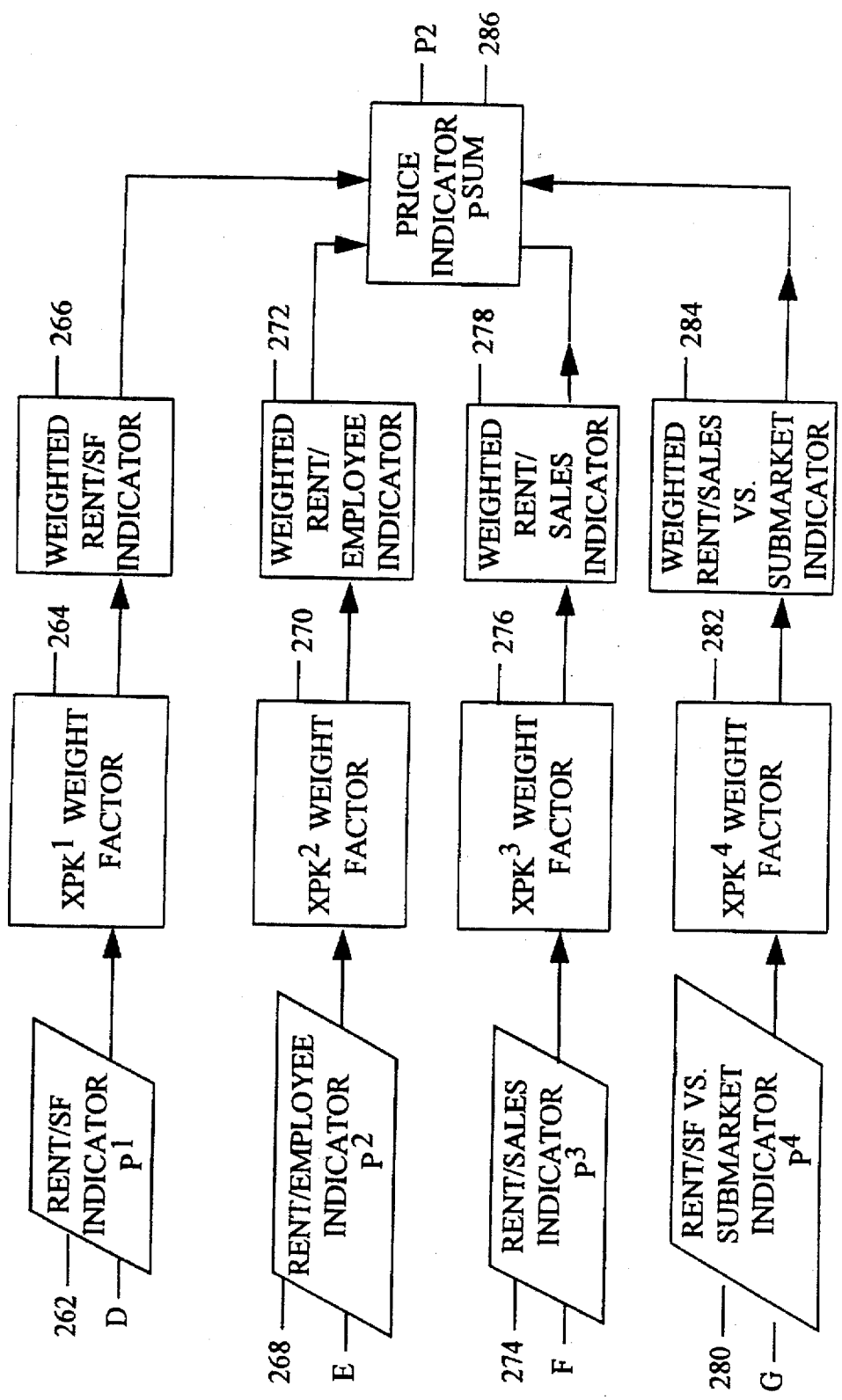

FIG. 10 represents a process flow chart for determining the total price indicator from the uses illustrated in the process flow charts of FIGS. 6–9. The value "D," from FIG. 6, is input (block 262), weighted (block 264) to produce a weighted indicator (block 266) that is added to similarly processed "E," "F," and "G" inputs, from FIGS. 7–9. "E" is input (block 268), weighted (block 270) to produce a weighted indicator (block 272) based upon rent per employee. "F" is input (block 274), weighted (block 276) to produce a weighted indicator (block 278) based upon rent per sales. "G" is input (block 280), weighted (block 282) to produce a weighted indicator (block 284) based upon rent per sales vs. submarket score. The four weighted values of blocks 266, 272, 278, and 284 are combined to produce the total price indicator (block 286). This total price indicator is output and denoted as "P2."

Figure 11:
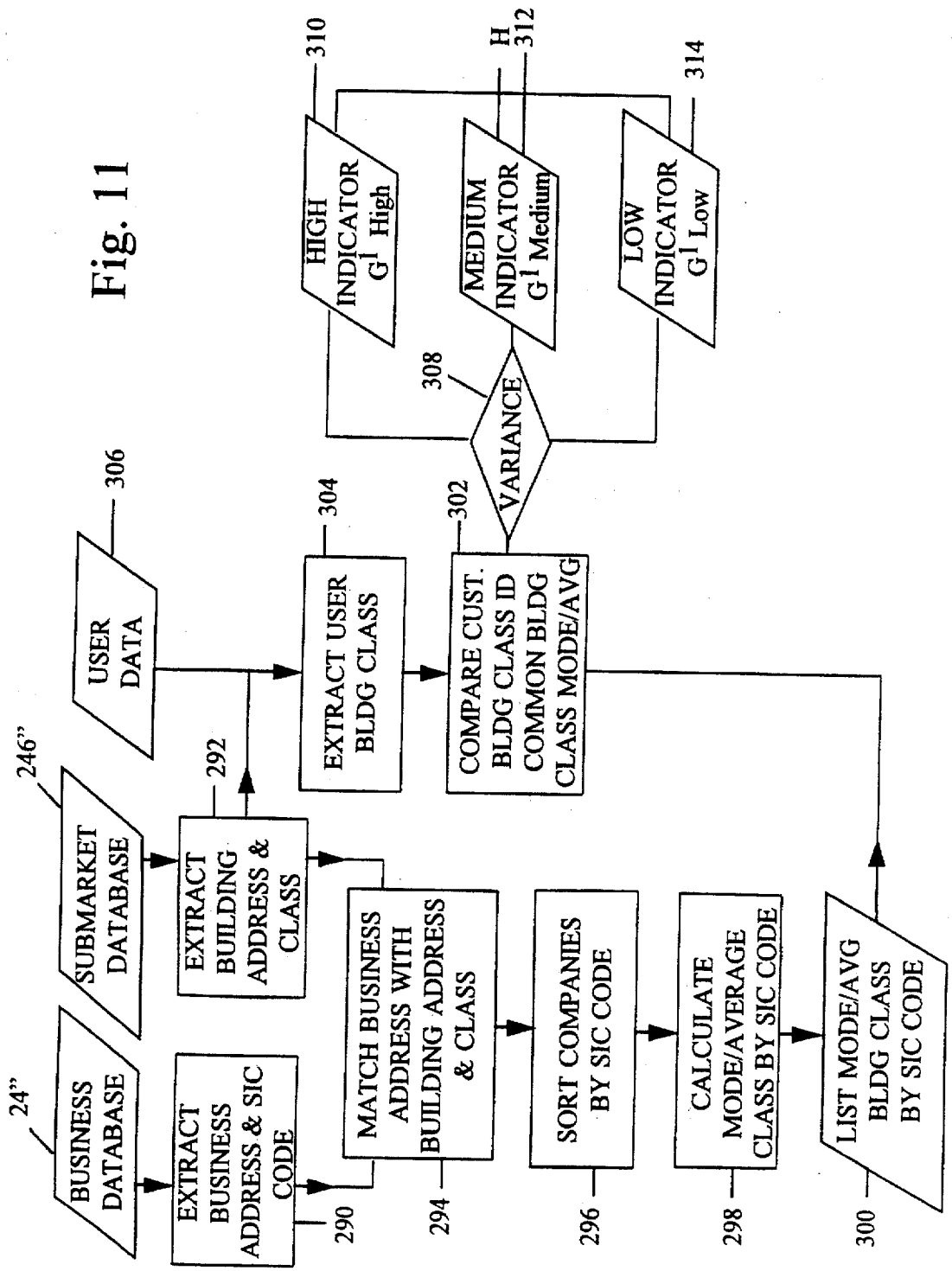

FIG. 11 represents a process flow chart for determining a grade indicator for building class. A business database 24" provides records (block 290), including business address and SIC code. A submarket database 24b" provides records (block 292, including building address and class information. The records (blocks 290, 292) are matched (block 294) so that business address is matched with building address and class; and those matched records are thereafter sorted by SIC code (block 296) to calculate (block 298) a mode/average building class by SIC code. A list of mode/average building class by SIC code is then generated (block 300) and compared (block 302) with data records (block 304), including building class of the real estate, from the Business Entity data record (block 306). A variance is then calculated (block 308) to determine whether to assign a high indicator (block 310), medium indicator (block 312), or low indicator (block 314). One of the indicators is produced as an output grade indicator "H."

Figure 12:
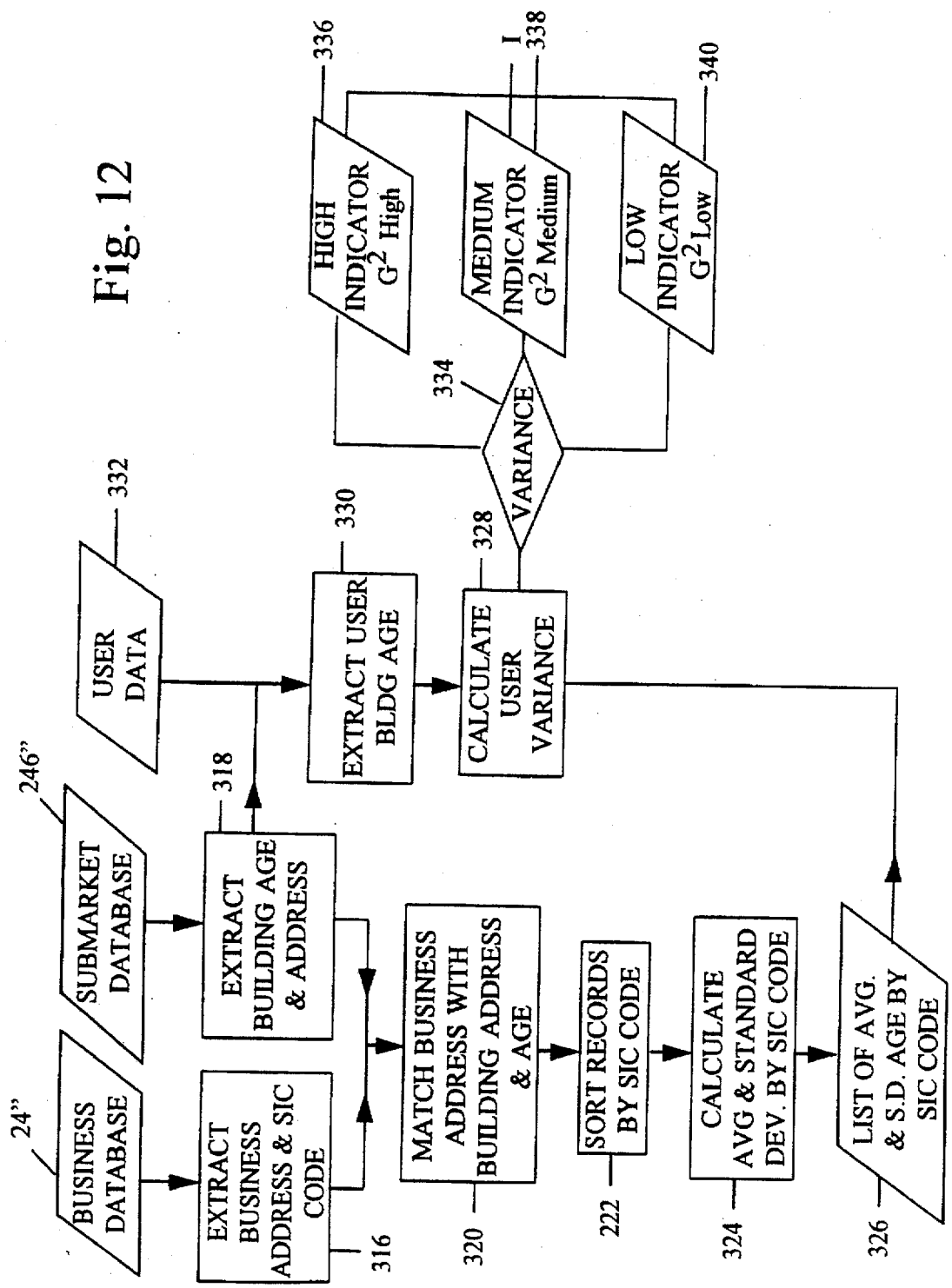

FIG. 12 represents a process flow chart for determining a grade indicator for building age. As above, a business database 24" provides records (block 316), including business address and SIC code. A submarket database 24b" provides records (block 318), including building address and age information. The records (blocks 316, 318) are matched (block 320) so that business address is matched with building address and age; and those matched records are thereafter sorted (block 322) to calculate (block 324) an average age and standard deviation by SIC code. A list of average, standard deviation and age class by SIC code is then generated (block 326) and compared (block 328) with data records (block 330), including building age of the selected real estate, from the business entity data record (block 332). A variance is then calculated (block 334) to determine whether to assign a high indicator (block 336, medium indicator (block 338), or low indicator (block 340). One of the indicators is produced as an output grade indicator "I."

Figure 13:
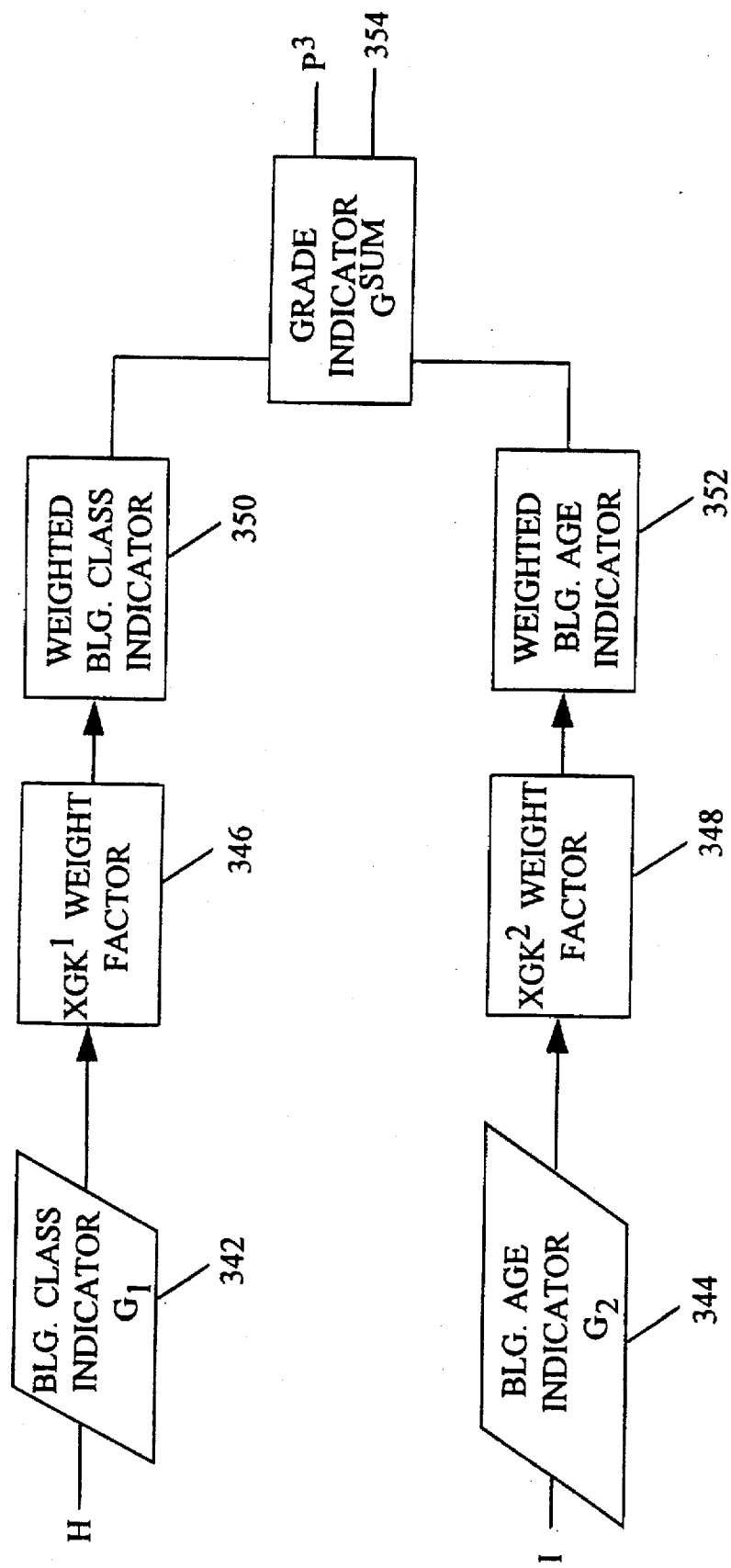

A total grade indicator is determined as in FIG. 13. "H" and "I" values from FIGS. 10 and 11 are input, respectively, as building class and building age records (blocks 342, 344). These records are weighted, respectively in blocks 346, 348, to determine a weighted grade-class indicator (block 350) and weighted grade age indicator (block 352); and these weighted indicators are thereafter summed (block 354) to produce a total grade indicator "P3."

Figure 14:
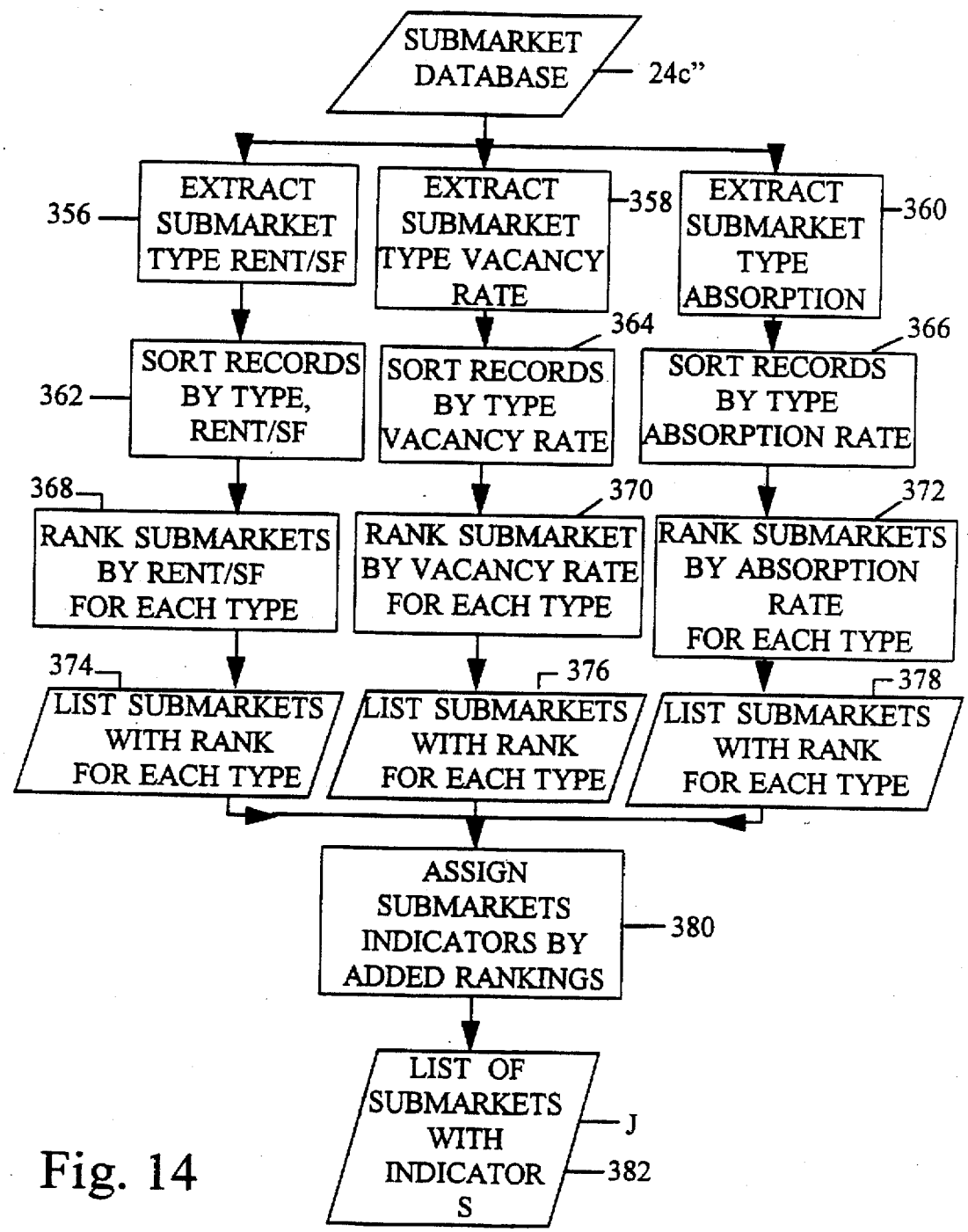
Figure 15:
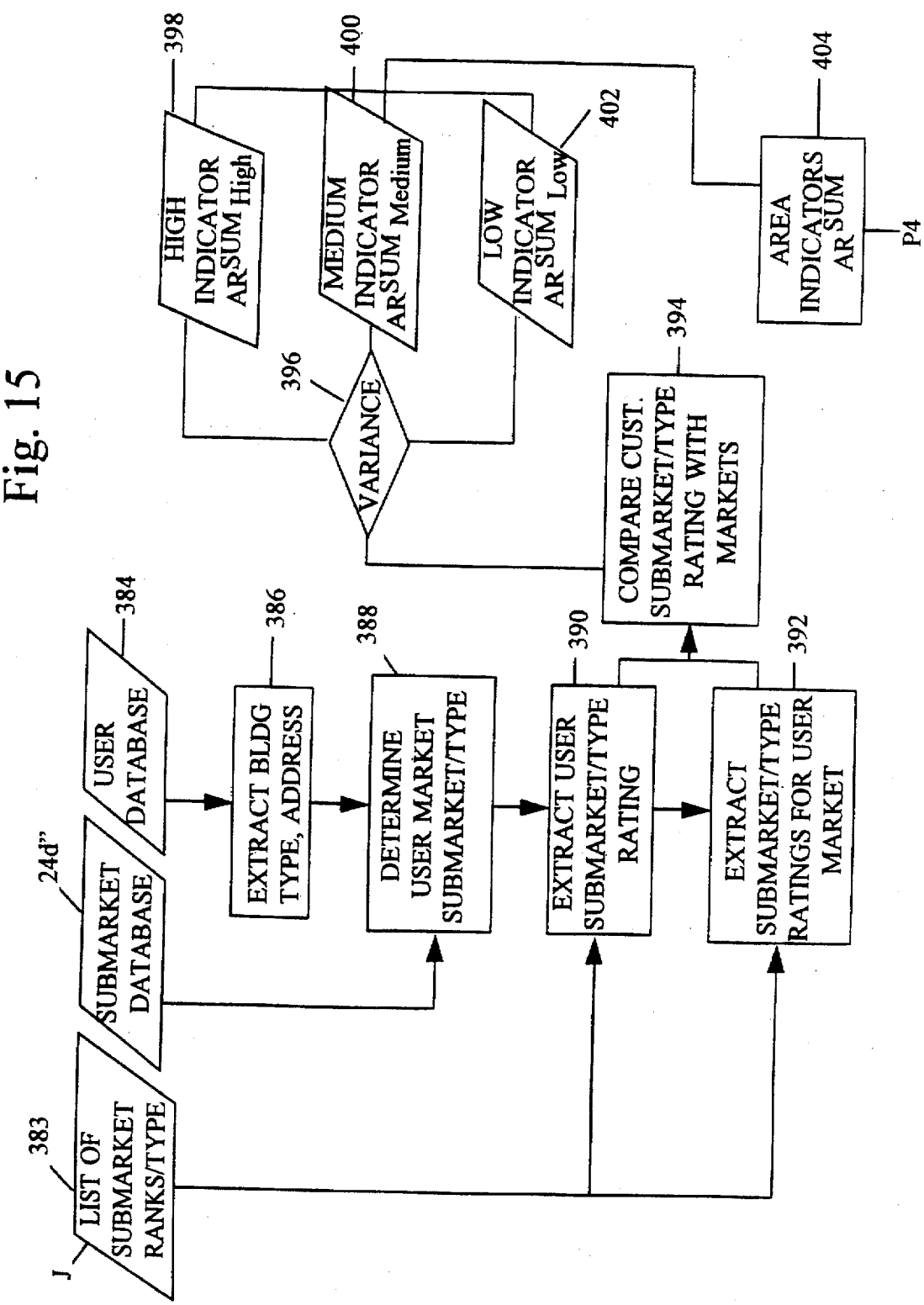

FIG. 14 shows process flow methodology for determining an area indicator based upon submarket ratings. A submarket database 24c" provides records (block 356) of submarket type and rent per square foot, records (block 358) of submarket type vacancy rate, and records (block 360) of submarket type absorption. Each of the records (blocks 356, 358 and 360) are sorted, respectively at blocks 362, 364 and 366, to compile records by property type and rent per square foot, type and vacancy rate, and property type and absorption rate. These records are ranked, respectively in blocks 368, 370 and 372 to rank submarkets by (i) rent per square foot for each property type, by (ii) vacancy rate for each property type, and by (iii) absorption rates for each property type. Lists are thereafter formed; (blocks 374, 376 and 378), to list submarkets with rank for each property type. Submarkets are thereafter given indicator values (block 380) by adding rankings to generate a list of submarkets with indicators (block 382). The submarket rating from FIG. 14 is generated as an output "J," which is combined and processed further as described below. submarket database 24d" to determine the Business Entity's market and submarket per type (block 388). This is combined with the information processed from the "J" input to extract a Business Entity submarket/type rating (block 390) and submarket ratings for the Business Entity's market (block 392). The Business Entity's submarket ratings is then compared (block 394) with the market's median to determine a variance (block 396). From the variance, a high (block 398), medium (block 400), and low (block 402) indicator is assigned to determine the area indicator (block 404). An output "P4" represents the area indicator, as shown and processed in further process flow diagrams below.

Figure 16:
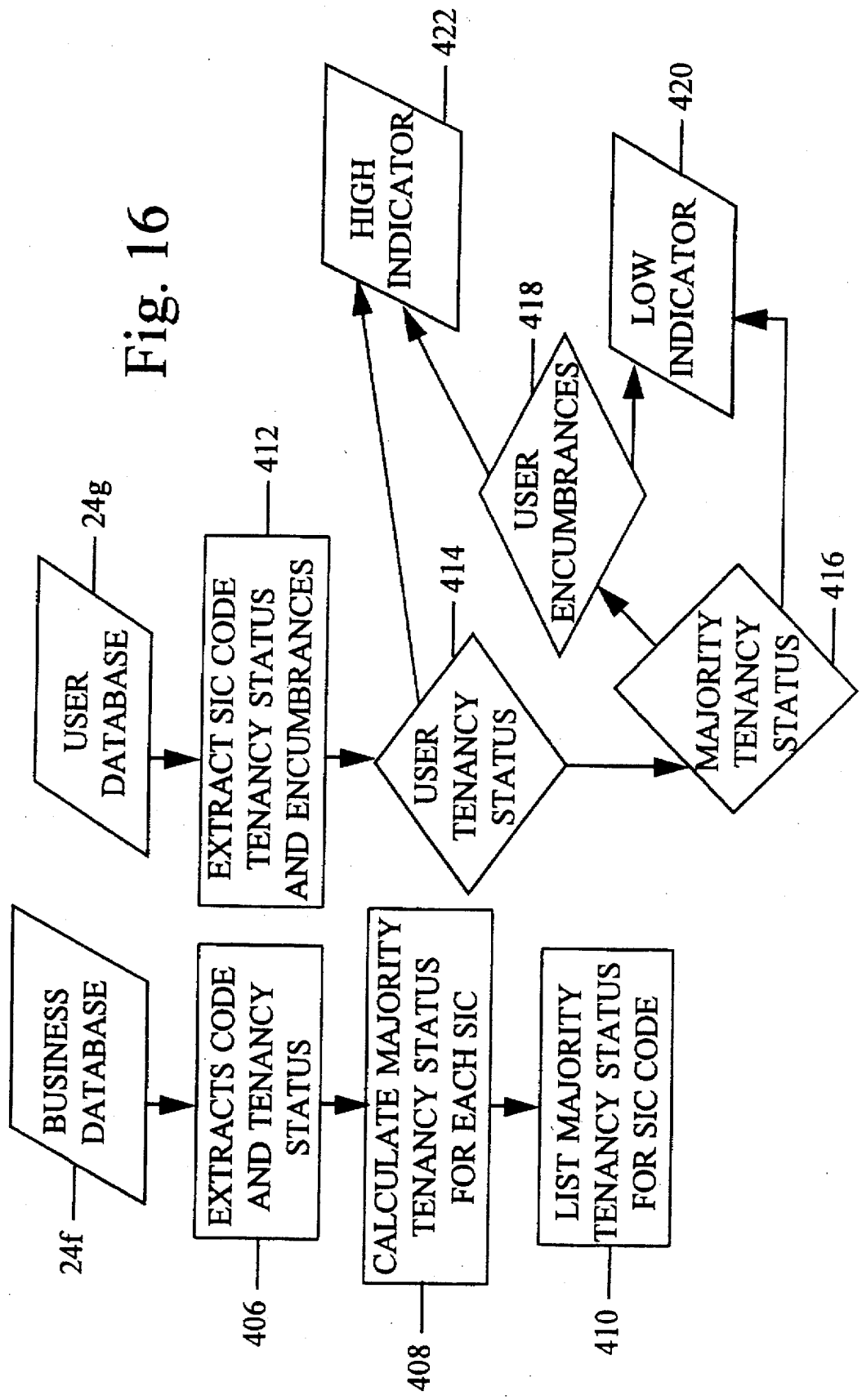

FIG. 16 shows the process flow methodology, according to the invention, for determining Financial Risk. A business database 24f provides records of the tenancy status of the business entities, from which code and tenancy status are extracted at step 406. This information is processed in step 408 to calculate majority tenancy status for each SIC code; and listed in step 410. Certain of the records in the list are extracted to correspond to the Business Entity's SIC code. Information records representing tenancy status and encumberances are extracted in step 412 from the Business Entity's data records 24g. The extracted records are used to determine the Business Entity's tenancy status in step 414 relative to the majority tenancy status for business entities with a similar SIC code in step 416. This comparison, together with data pertaining to the presence of encumberances in step 418, is used to determine whether the Financial risk indicator is high, in step 422, or low, in step 420. A total financial risk indicator "K" is utilized and processed in the further figures detailed below.

Figure 17:
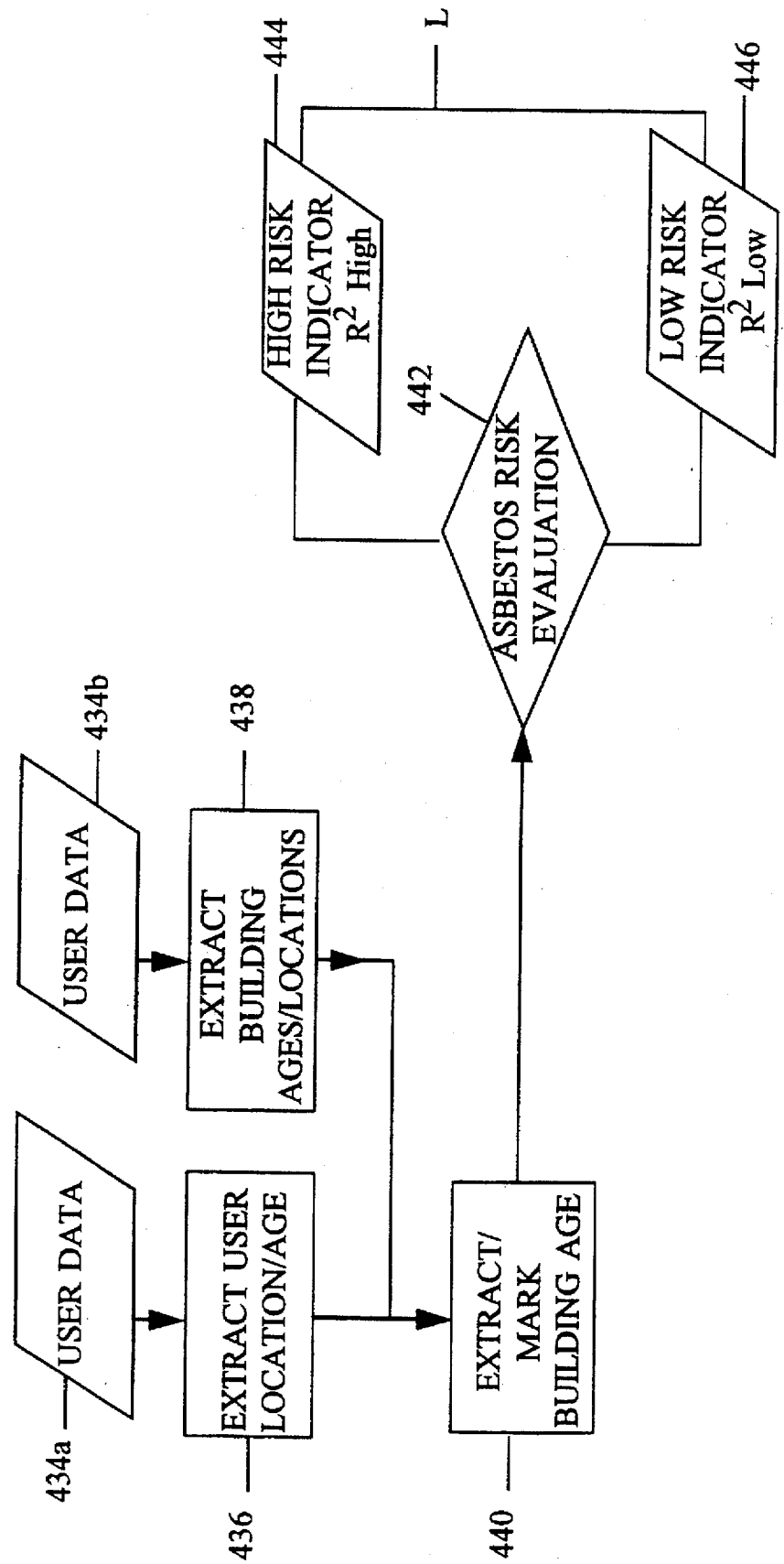

A risk indicator for asbestos is generated in the process flow of FIG. 17. Data 434a, 434b from the Business Entity is used to extract information about (i) the real estate's location and age (block 436), and (ii) the real estate's location and building age (block 438). Such information is processed (block 440) to facilitate an evaluation about asbestos risk (block 442); and a high asbestos risk indicator (block 444) or a low asbestos risk indicator (block 446) is assigned based upon that evaluation. An asbestos risk indicator "L" is then generated for later use.

Figure 18:
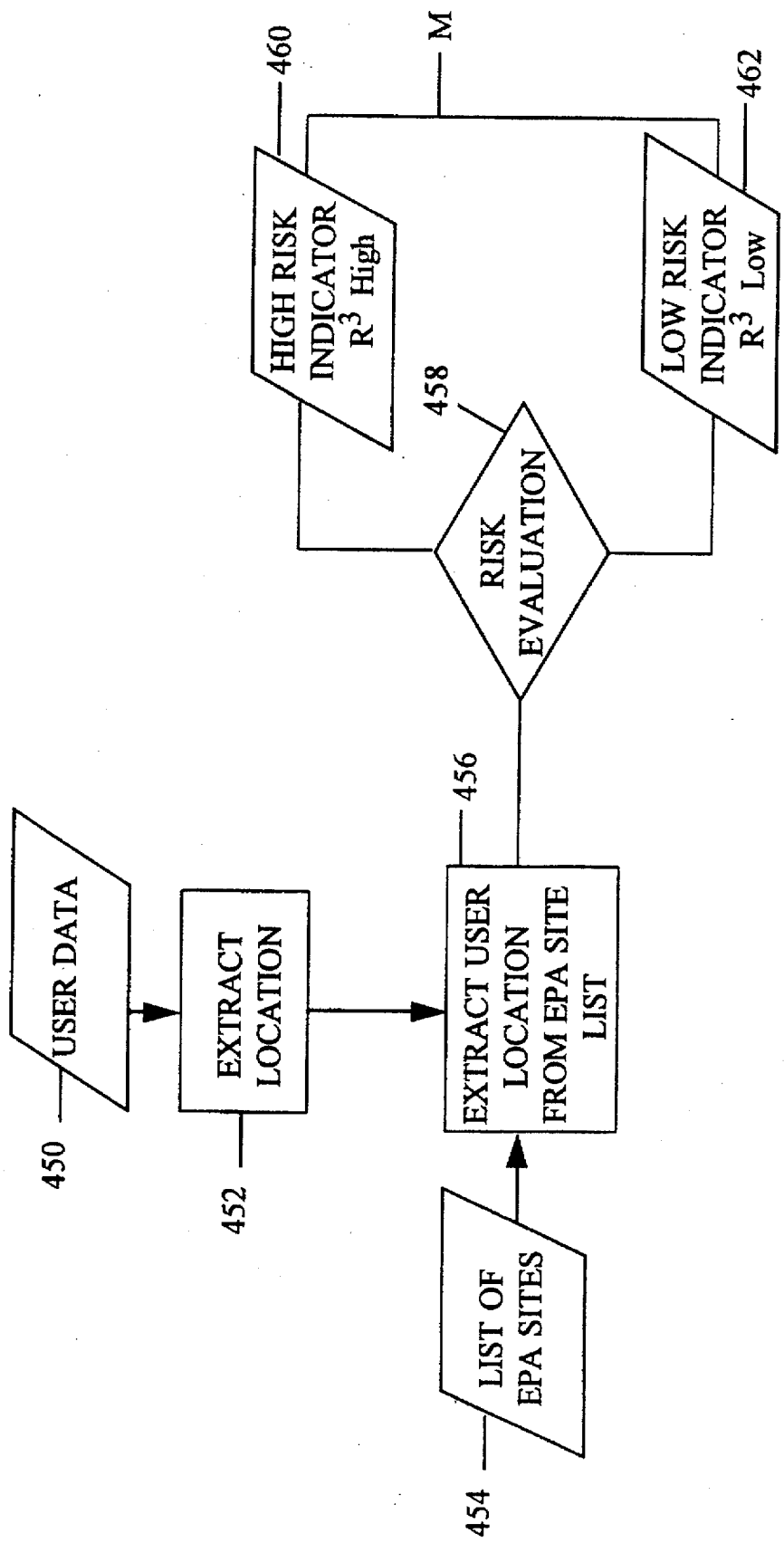

A risk indicator for sites identified by the Environmental Protection Agency (EPA) is determined in the process flow shown in FIG. 18. Data records (block 450) from the Business A risk indicator for sites identified by the Environmental Protection Agency (EPA) is determined in the process flow shown in FIG. 18. Data records (block 450) from the Business Entity are used to extract (block 452) location information. Data information including a list of EPA sites (block 454) is compared (block 456) with the extracted information from the Business Entity to evaluate (block 458) whether there is a risk associated with the EPA sites. A high risk indicator (block 460) is assigned if there is a risk; and a low risk indicator (block 462) is assigned if there is not a significant risk associated with the real estate location. A risk indicator "M" is generated for later use.

Figure 19:
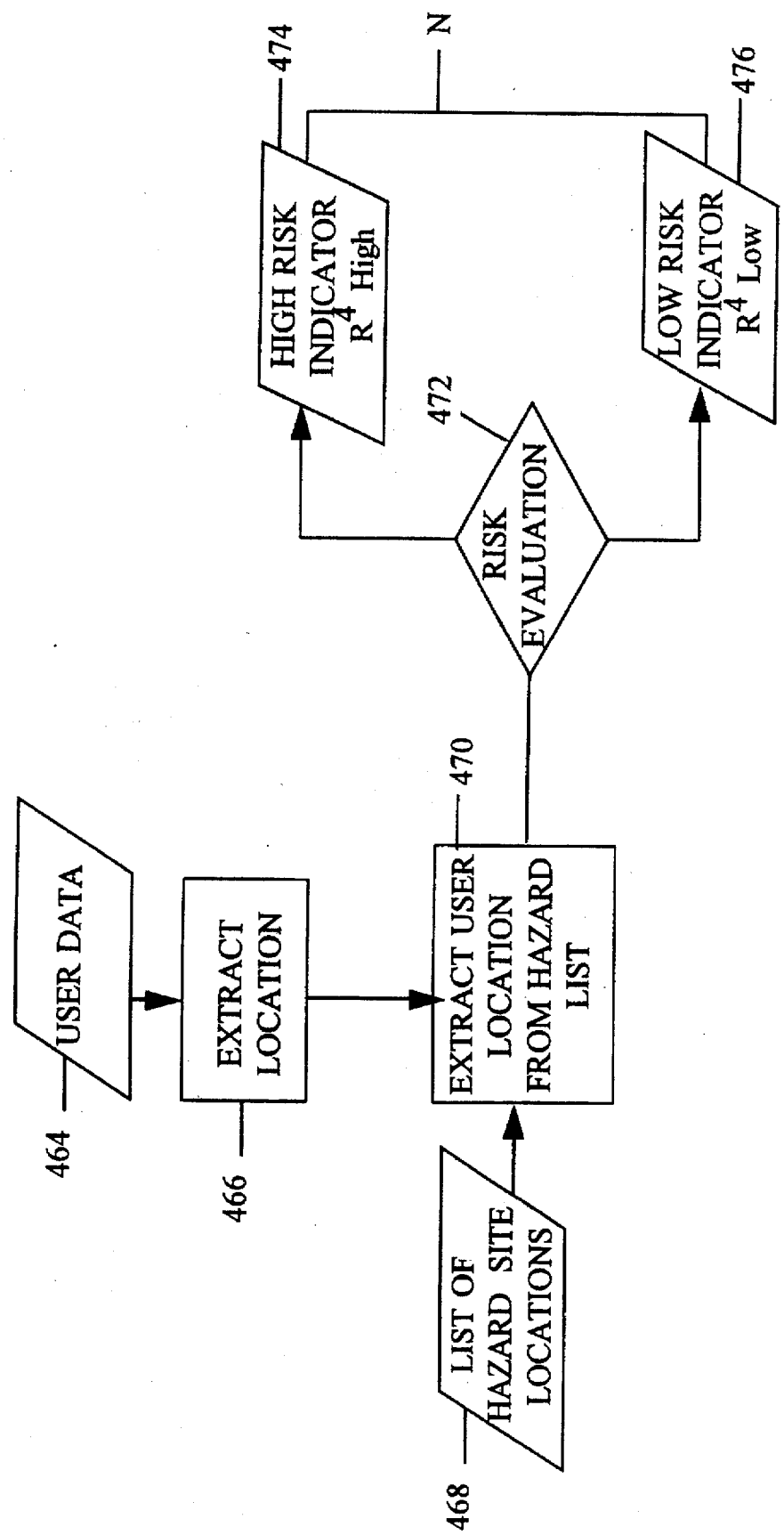

A risk indicator for radon sites is determined in the process flow shown in FIG. 19. Data records (block 464) from the Business Entity are used to extract (block 466) location information. Data information including a list of hazardous site locations (block 468) is compared (block 470) with the extracted information from the Business Entity to evaluate (block 472) whether there is a risk associated with the hazardous sites. A high risk indicator (block 474) is assigned if there is a risk; and a low risk indicator (block 476) is assigned if there is not a significant risk associated with the real estate location. A risk indicator "N" is generated for later use.

Figure 20:
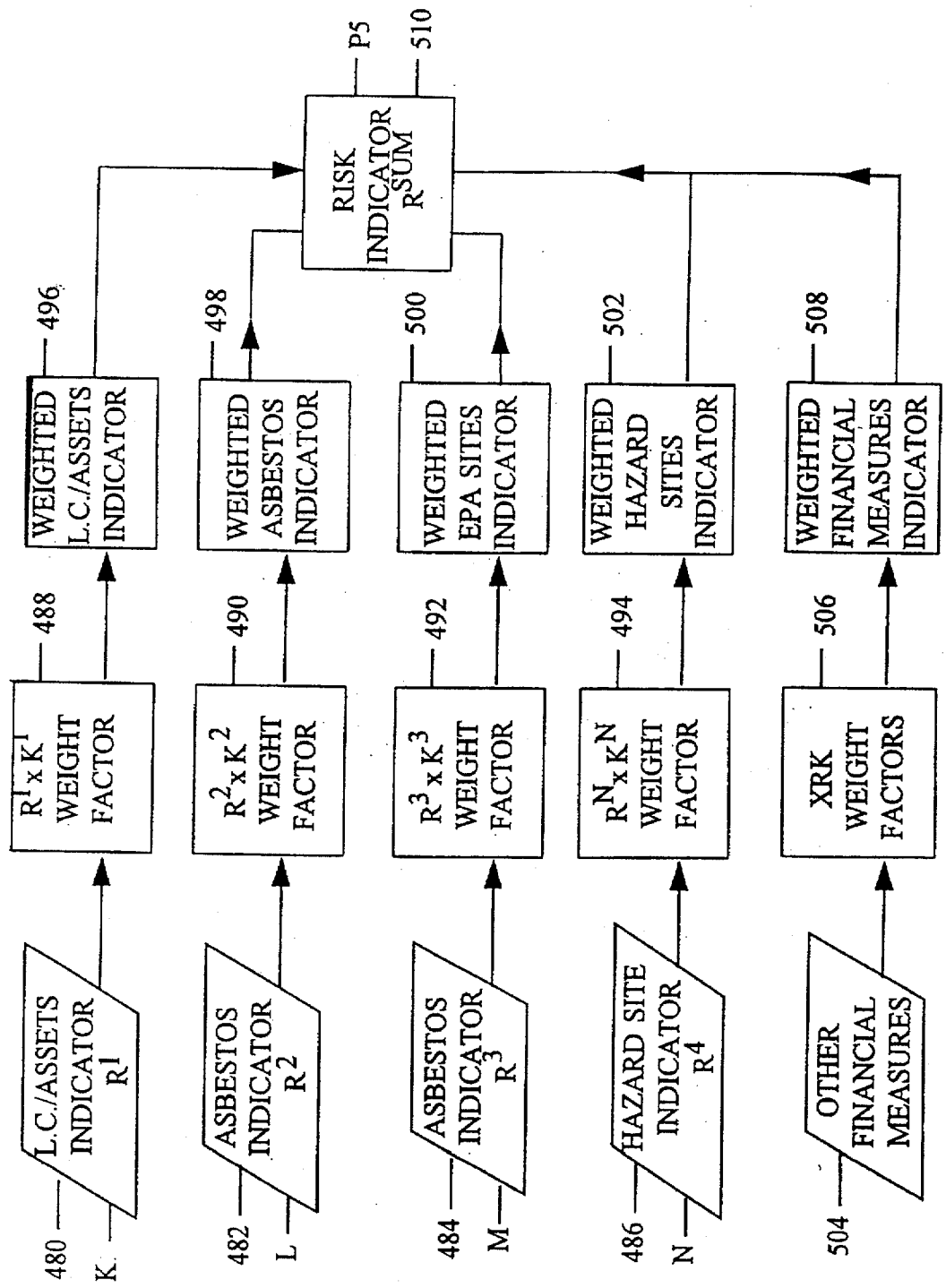

FIG. 20 shows process flow methodology for combining the several risk indicators into a total risk indicator P5. Specifically, indicators "K," "L," "M," and "N" are entered into blocks 480, 482, 484 and 486; and thereafter weighted (blocks 488, 490, 492 and 494) to produce weighted indicators (blocks 496, 498, 500 and 502). If available, other financial risks (block 504) can be factored in by weighting (block 506) to produce an additional weighted risk factor (block 508). The various weighted indicators (blocks 496, 498, 500, 502 and 508) are combined (block 510) to generate a total risk indicator P5.

Figure 21:
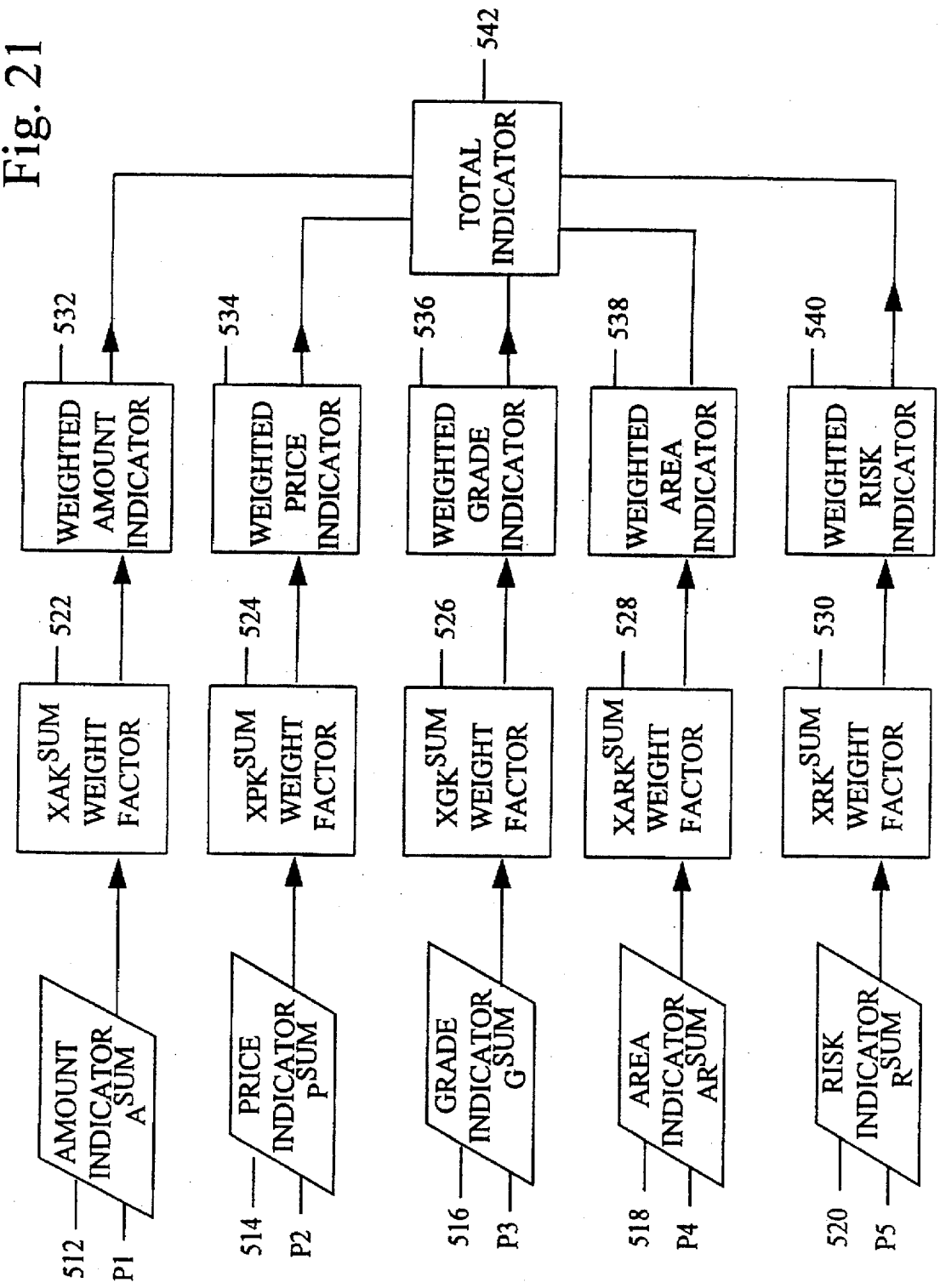

Process methodology for combining the indicators P1–P5 is shown in FIG. 21. Each indicator P1–P5 is entered into blocks 512, 514, 516, 518 and 520, and weighted by blocks 522, 524, 526, 528 and 530 to generate weighted indicator values (blocks 532, 534, 536, 538 and 540). The values are summed (block 542) to generate a total score which provides an evaluation of real estate condition for the Business Entity.

The invention also preferably provides a full BUSINESS REAL ESTATE REPORT as an information tool that enables top management of any company that occupies real estate to evaluate in basic terms its real estate condition relative to other companies in its industry and the conditions of the real estate market in its area. The report combines reporting of basic facts about the Business Entity and its real estate submarket with analytical, comparative data in six sections: IDENTIFICATION DATA, THE SCORE, REAL ESTATE DATA, KEY REAL ESTATE RATIOS, MARKET CONDITIONS, FACILITY RELOCATIONS AND/OR TRANSACTIONS. A list of REAL ESTATE TERMS AND DEFINITIONS is also provided to assist the Customer that is not a real estate specialist. The elements of each section are listed and described below:

IDENTIFICATION DATA

The IDENTIFICATION Section of the Business Real Estate Report is used to communicate basic facts about the Business Entity, including name, address, contact person and top level financial information. The section is designed to enable the Customer to immediately identify the location covered by the report. Some of the identifying details are listed below.

NAME—The recorded name of the Business Entity, the corporate name or the DBA name may appear at the user's option; ID NUMBER—An identifying number that is unique to each company; STREET—The street address for the location described in the report; CITY/STATE/ZIP—The City, State and Zip Code for the location described in the report; CONTACT—The name and title of the principal, employee or agent of the Business Entity; BILLING INFORMATION—Financial and/or credit information about the Business Entity and/or the Customer as appropriate; TELEPHONE—The telephone and fax numbers for the Business Entity's principal, employee or agent ordering the report; SIC CODE—The Standard Industrial Classification code assigned by the U.S. Department of Commerce that describes the primary business of the Business Entity at the specified location; DATE PRINTED—The date the real estate information report was printed (this is an automatic "tag" that is always updated whenever the report is printed so that Customers of multiple copies will always be able to identify the most recent report); STATEMENT DATE—The date of relevance for the information included in the report (typically this will be the balance sheet and income statement date for financial information; and this date changes only when the Business Entity's record has been updated for new financial/real estate information; TOTAL EMPLOYEES—The total number of staff employed by the Business Entity at all locations as of the statement date, including locations not covered by the report. This information is provided to scale the size of the Business Entity; EMPLOYEES/THIS LOCATION—The total number of staff employed by the Business Entity at the specific location covered by the report as of the statement date; TOTAL LOCATIONS—The total number of locations/facilities operated by the Business Entity(this information includes all facilities owned or leased by the Business Entity for operations, but does not include facilities owned strictly for investment purposes, or leases that have been sublet, and that are not occupied by the Business Entity); RENT/TOTAL LOCATIONS—The total annual rent in U.S. dollars paid by the tenant for all locations counted in the "Total Locations" element; TOTAL SALES—The total amount of annual revenue/sales earned by the Business Entity's operations at the specific location covered by the report, as of the statement date (this element does not include revenue/sales earned by operations at other locations); GROSS PROFIT—The total amount of annual gross profit earned by the Business Entity's operations at the specific location covered by the report, as of the statement date (this element does not include gross profit earned by operations at other locations); NET PROFIT—The total amount of annual net profit earned by the Business Entity's operations at the specific location covered by the report, as of the statement date (this element does not include net profit earned by operations at other locations).

SCORE DATA

The Score data section provides an index of the Business Entity's real estate to provide a quick measures of its condition. The Score preferably has the five indicators described above: AMOUNT, PRICE, GRADE, AREA and RISK. The Business Entity's score for each of these five indicators is provided in this section of the Business Real Estate report. The aggregate, or total, score is also presented here.

REAL ESTATE DATA

The REAL ESTATE DATA section of the Business Real Estate Report provides key facts about the Business Entity's real estate situation at the specified location. This section does not include any analytical ratios or comparative data. Such data includes the following:

MARKET—The name of the submarket the Customer site is located (the submarket is determined by locating the address on a predefined submarket locations list); SPACE TYPE—The type of space the Business Entity occupies (this field can be supplied by the Business Entity or determined by cross-reference from SIC codes); STATUS—A one-word statement of the Business Entity's occupancy status at the specified location ("Owns" indicates that the Business Entity has title and ownership rights to the specified property; "Lease" indicates that the Business Entity does not have ownership of the property, but has occupancy rights derived from periodic payments directly or indirectly to the owner of the property); SQUARE FEET—A numeric statement of the total square feet of space occupied by the Business Entity at the specified location (the amount should included the amount of square feet for which the Business Entity has exclusive rights, including occupied, "core" and unused space; and this amount does not include space for which the Business Entity does not have exclusive rights—e.g. subleased space); RENT/THIS LOCATION—The annual rent the Business Entity pays in rent for the right to occupy the square footage in the specified location (this field does not apply to owned locations); LEASE EXPIRATION—The date that the base lease for the specified location expires (the base lease is defined as the term of the current lease commitment by the lessee and lessor, and does not include the term for renewal options that may be specified in the lease); BUILDING AGE— The smaller of a) the number of years that have elapsed since building was constructed, or b) the number of years that have elapsed since the building was renovated; RELOCATION DATE—The date at which the Business Entity occupied the specified location; TEXT DESCRIPTION—A verbal summary of the Business Entity's real estate situation.

KEY REAL ESTATE RATIOS

The KEY REAL ESTATE RATIOS section provides analytical information about the Business Entity's real estate situation. This section is supported by data elements from the previous two sections.

This section also provides comparable ratios from the statistical analysis of data from other companies with the same government SIC code: Two sets of comparative ratios for Business Entities are provided: a) across similar companies within the national market of the country in which the real estate is located, and b) across similar companies within the Business Entity's market. The comparative data is structured to include the Highest, Lowest and Average occurrence of each ratio from available data.

RENT/SQUARE FEET—The amount of annual rent paid for the specified location divided by the amount of square feet occupied; SQUARE FEET/EMPLOYEE—The amount of square feet divided by the number of staff employed at the location; RENT/EMPLOYEE—The amount of annual rent paid for the specified location divided by the number of staff employed at the location; SALES/SQUARE FEET—The amount of Revenue/Sales generated by operations at the specified location divided by the number of square feet occupied; SALES/EMPLOYEE—The amount of Revenue/Sales generated by operations at the specified location divided by the number of staff employed at the location.

MARKET CONDITIONS

The MARKET CONDITIONS section provides information about a specified real estate submarket, normally the one in which the Business Entity has a location. The information is defined to meet the information needs of current or prospective tenants in the market rather than developers, lenders, brokers or investors. The section tracks five real estate market data elements for three facility types.

TYPE—The type (i.e. Office, Retail or Industrial) and grade (i.e. quality) of building; SQUARE FEET—The total amount of square feet that exists in the specified submarket, for a specific building type and grade level; VACANCY %—The amount of square feet for a specified building type and grade level in a specified submarket that is unoccupied but available for occupancy, divided by the total amount of square feet of the building type and grade that exists in the submarket; RENT/SQUARE FOOT— The amount of Effective Rent that is being negotiated in new leases for the building type and grade in the submarket. Asking Rent may be used as a proxy where Effective Rent is not available; ANNUAL ABSORPTION—The net change within a specified twelve month period in the total amount of square feet of the specified type and grade within the submarket; AVERAGE LEASE TERM—The average length of base lease commitments (in years and months) being negotiated in new agreements for the specified building type and grade within the submarket (the average does not include lease renewal options); TEXT DESCRIPTIONS—A verbal summary of the specified real estate submarket's condition.

FACILITY RELOCATIONS AND/OR TRANSACTIONS

The FACILITY RELOCATIONS AND/OR TRANSACTIONS section lists a selection of recent facility relocations and/or transactions for each of the building types within the specified submarket. The section is designed to provide current and potential tenants of a submarket a profile of market conditions by listing actual-recent transactions in the market.

The section is structured as a matrix, with columns of information elements for rows of actual transactions. At least three facility relocations and/or transactions are listed for each building type: 1) the one with the highest amount of rent paid per square foot, 2) the one with the lowest amount, and 3) the one to the median.

TYPE—Indicates whether the facility relocation and/or transaction is for Office, Retail or Industrial Space; RANGE—Indicates whether the facility relocation and/or transaction is the Highest, Lowest or Median priced facility relocation and/or transaction in the submarket for a specified property type; RENT/SF—The rent paid per square foot for the specified facility relocation and/or transaction; SQUARE FEET—The total amount of square feet included in the specified facility relocation and/or transaction; SIC—The Standard Industrial classification code for the lessee in the specified facility relocation and/or transaction; DATE—The date of the facility relocation and/or transaction, or the tenant occupancy date (the date the tenant took possession of the location) for the specified facility relocation and/or transaction; ADDRESS—The street address of the location of the space included in the facility relocation and/or transaction.

REAL ESTATE TERMS AND DEFINITIONS

A listing of terms used in the report, whose meanings may not be self-evident to the typical Customer, with explanatory definitions.

BUILDING TYPES

OFFICE—OFFICE BUILDINGS accommodate people performing work at desks and in meetings. Initially, three grades of office buildings are used in the Report, although further classifications may be introduced:

1. CLASS A buildings have been constructed or renovated, typically in the last 10 years. They include premium features, such as marble finishes and atriums, and services, such as concierges.
2. CLASS B buildings have been constructed or renovated, typically in the last 10 years. They typically do not include premium features and services; or they were Class A buildings more than 10 years old, without major renovations.
3. CLASS C buildings have minimal features, no services, no elevators, limited air conditioning, and/or may have asbestos.

RETAIL—RETAIL PROPERTIES accommodate commercial establishments offering goods and services to the public. SINGLE properties house one tenant. SHOPPING CENTERS house multiple tenants, but each Center is managed and operated as one entity. Initially, four classes of shopping centers are used in the Report. These are differentiated by square footage, use and features, although other differentiations and/or further classifications may be introduced based on established industry and professional classifications from organizations such as the International Council of Shopping Centers and the Urban Land Institute. These are ranked in order, from smallest to largest, based on square footage thresholds that change from time to time as a result of changes in industry and/or local practice.

1. STRIP CENTERS have tenants which offer convenience goods and personal services (e.g. dry cleaners, drug stores). They do not have an anchor tenant (e.g. supermarket).
2. NEIGHBORHOOD CENTERS have tenants which offer a limited range of goods and services. They have one anchor tenant.
3. COMMUNITY CENTERS have tenants which offer a broad range of goods and services (e.g. apparel, appliances). They have multiple anchor tenants (e.g. a "junior" department or variety store, and a supermarket).
4. REGIONAL CENTERS have numerous tenants which offer a full range of goods and services (e.g. apparel, furniture, general merchandise). They have multiple anchor tenants, including at least one major department store.

INDUSTRIAL—INDUSTRIAL PROPERTIES are used for warehousing, wholesaling, distribution, assembly and manufacturing. Some can be adapted for office and retail use. Initially, two classes of industrial buildings are used in the Report, although further differentiations and/or classifications may be introduced based on established industry and professional classifications from organizations such as the Society of Industrial and Office Realtors and the National Association of Industrial and Office Parks.

1. FLEX buildings are one-two level facilities for distribution, light manufacturing and/or limited office uses.
2. WAREHOUSE buildings are one-two level buildings for distribution and light manufacturing, but do not have the infrastructure or finishes necessary for conversion to office or retail use (i.e. heating/air conditioning capacity, plumbing).

MARKET CONDITIONS

Data displayed for market conditions can include the following:

SQUARE FEET—The total number of square feet in a market or submarket; VACANCY RATE—The percentage of square feet that is available for lease in a market, submarket or building;

RENT/SQUARE FOOT—The annual price per square foot, that is quoted in each market and submarket; ANNUAL ABSORPTION—The net reduction in vacant square feet over a twelve-month period resulting from new tenants, new construction, and lease terminations;

OPERATING EXPENSES/SF—The annual payments per square foot by a tenant for real estate taxes, utilities and maintenance.

FACILITY RELOCATIONS AND/OR TRANSACTIONS:

Data displayed for facility relocations and/or transactions can include the following:

RENT/SQUARE FOOT—The annual payments per square foot by the Business Entity, acting as a tenant, for the right to occupy the real estate; SQUARE FEET—The number of square feet stipulated in the lease for occupancy by the tenant; SIC CODE—The Standard Industrial Classification Code, published by the Department of Commerce, which classifies the business activities of the Business Entity; DATE—The date on which the lease and/or other contractual document binding the Business Entity to the commenced real estate; ADDRESS—The location of the real estate listed in the lease and/or other contractual document binding the Business Entity to the real estate.

KEY REAL ESTATE RATIOS:

Data of Key Real Estate Ratios can include the following:

RENT/SQUARE FOOT—The annual payments per square foot by the Business Entity, acting as a tenant, for the right to occupy the real estate; RENT/SALES—The total annual payments for the right to occupy the real estate divided by the annual sales generated by the Business Entity's operations in the real estate; SQUARE FEET/ EMPLOYEE—The total number of square feet in the Business Entity's real estate divided by the number of full time equivalent employees that work in the real estate; RENT/EMPLOYEE—The total annual payments for the right to occupy the real estate divided by the total number of full time equivalent employees that work in the real estate; SALES/SQUARE FOOT—The annual sales generated by the Business Entity's operations in the real estate divided by the number of square feet in the real estate; SALES/EMPLOYEE—The annual sales generated by the Business Entity's operations in the real estate divided by the number of full time equivalent employees in the real estate.

The invention thus attains the objects set forth above, in addition to those apparent from the preceding description.

Since certain changes may be made in the apparatus and methods described herein without departing from the scope of the invention, it is intended that all matter contained in the above description or shown in the accompanying drawing be interpreted as illustrative and not in a limiting sense.

It is also understood that the following claims cover all the specific and generic features of the invention described herein, and all statements of the scope of the invention which, as a matter of language, might be said to fall there between.

In view of the foregoing, what is claimed as new and secured by the Letters Patent is:

1. A method for evaluating real estate for use by a Business Entity, comprising the steps of:

storing utilization information about the real estate in a database, the utilization information including (i) square footage data representing a square footage of the real estate, (ii) data characterizing the selected use of the real estate, (iii) cost data including a rental price of the real estate, (iv) data about the number of the Business Entity's employees in the real estate, and (v) data about the sales or revenue of the Business Entity in the real estate, storing data representing utilization values in the database from business entities which are similar to the Business Entity, determining a utilization indicator of the real estate by processing information in the database, the utilization indicator having a numerical representation and being a function of (i) the square footage, (ii) the selected use, (iii) the cost data including the rental price, (iv) the employee data, and (v) the sales data, processing the numerical representation to produce a score representing a quantitative evaluation of the real estate, generating a report that includes the score, and displaying the report for use by the Business Entity.

2. A method according to claim 1 wherein the real estate comprises one of (i) a single location occupied by the Business Entity, and (ii) multiple locations occupied by the Business Entity.

3. A method according to claim 1, further comprising the steps of:

extracting from a business database space utilization data records of other business entities having a standard industrial classification code that is similar to the Business Entity's standard industrial classification code, each of the space utilization data records including information representing at least one of (i) a square footage of real estate occupied by one of the other business entities, (ii) a number of employees of one of the other business entities in the real estate, and (iii) sales or revenue of the Business Entity in the real estate, determining space utilization values from the extracted space utilization data records by calculating at least one of a (i) square footage per employee of the Business Entity in the real estate; and (ii) a sales or revenue per square foot of the Business Entity in the real estate, determining an average and standard deviation for the space utilization values, determining a variance between a space utilization value of the Business Entity in the real estate and the average space utilization values, and assigning a value to the indicator based upon a comparison between the variance and the standard deviation.

4. A method according to claim 1 wherein the step of determining a utilization indicator comprised the step of determining the utilization indicator on a periodic basis.

5. A method according to claim 1, further comprising the steps of:

extracting from a business database cost utilization data records of the other business entities which have one of (i) a standard industrial classification code that is similar to the Business Entity's standard industrial classification code, and (ii) a location with a real estate submarket that is similar to a submarket of the Business Entity, each of the cost utilization data records including information representing at least one of (i) a number of employees occupying real estate of the business entities, (ii) a square footage of the real estate, (iii) rental costs of the real estate, and (iv) sales or revenue of the business entities in the real estate, determining cost utilization values from the extracted cost data records by calculating at least one of a (i) rental price per square foot of the real estate, (ii) rental price per employee of the real estate, and (iii) sales or revenue of the other business entities in the real estate per rental price of the real estate, determining an average and standard deviation for the cost utilization values, determining a variance between a cost utilization value of the business entity and the average cost values of the similar business entities, and assigning a value to the indicator based upon a comparison between the variance and the standard deviation.

6. A method according to claim 1, further comprising the steps of (i) determining a grade indicator of the real estate, the grade indicator having a numerical representation and being a function of (i) a classification system of the real estate that is consistent with accepted standards, and (ii) application of that system to buildings occupied by the business entities which are similar to the Business Entity, the grade indicator thereby providing a numerical representation of the quality of the real estate, and (ii) processing the grade indicator with the numerical representation of the utilization indicator to produce the score.

7. A method according to claim 6 wherein the classification system comprises a numerical representation of the property grades.

8. A method according to claim 6 wherein the step of determining a grade indicator comprises the further steps of (i) extracting from a data source, location data records of the business entities which have a standard industrial classification code that is similar to the Business Entity's standard industrial classification code, and (ii) storing the location data records on the database.

9. A method according to claim 6, further comprising the step of assigning a classification to the buildings based upon at least one of the following: (i) a building grade as reported by experts familiar with classification systems and generally accepted standards, (ii) an age of the building, and/or (iii) an extrapolation of comparable buildings.

10. A method according to claim 6 wherein the step of determining a grade indicator comprises the further step of assigning grade classifications to the buildings.

11. A method according to claim 10 wherein the step assigning grade classifications comprises the further step of assigning a range of numerical values to the buildings based on the assessed grade of the buildings.

12. A method according to claim 6, further comprising the steps of determining an average and standard deviation for the grade classifications, determining a variance between the grade classification of the Business Entity's real estate and the average grade classifications of the real estate of the similar entities, and assigning a value to the grade indicator based upon a comparison between the variance and the standard deviation.

13. A method according to claim 1, further comprising the steps of (A) determining an area indicator of the real estate, the area indicator having a numerical representation and being a function of at least one of (i) rents, (ii) vacancy, and (iii) absorption rates for each of the Business Entity's submarket and nearby submarkets, and (iv) other indicators of submarket and location attractiveness, the area indicator thereby being a measure of the attractiveness of the real estate, and (B) processing the area indicator with the utilization indicator to produce the score.

14. A method according to claim 13 wherein the step of determining an area indicator comprises the further steps of defining a list of submarkets, extracting from a real estate market database, for each of the submarkets, at least one of the following submarket values: (i) rents, (ii) a vacancy rate, and (iii) an annual absorption rate;

calculating submarket rankings for the submarkets based upon the submarket's values compared with other submarkets within the same market, and developing a submarket ranking for the location of the real estate.

15. A method according to claim 13, further comprising the step of assigning a value to the area indicator based upon a comparison between the Business Entity's submarket and nearby submarkets.

16. A method according to claim 1, further comprising the step of determining a risk indicator of the real estate, the risk indicator having a numerical representation of a financial, market, and environmental exposure of the real estate, the risk indicator being a function of at least one of (i) a building age, (ii) a presence of asbestos, (iii) a presence of toxic waste sites and/or other man-made environmental hazards, (iv) a presence of a naturally occurring environmental hazard, (v) a presence of financial obligations and encumberances of the Business Entity for the real estate, (vi) a tenancy status and/or remaining time before a financial obligation of the Business Entity for the real estate, is terminated; and/or other measures of financial, market and environmental risks, as defined by industry, professional and/or governmental organizations and generally accepted in industry or professional practice.

17. A method according to claim 16, further comprising the step of evaluating at least one of the following: (i) an age of the real estate, (ii) a risk of exposure to asbestos in the real estate (iii) a proximity of one or more toxic waste sites to the real estate, (iv) a proximity of one or more naturally occurring environmental hazards to the real estate, (v) any remaining financial obligations and encumberances of the Business Entity for the real estate, (vi) any tenancy status of the Business Entity for the real estate, (vii) other measures that indicate potential health and safety risks for occupants of the real estate, and financial and market risks of the Business Entity for the real estate.

18. Apparatus for evaluating selected real estate for a selected use by a Business Entity, comprising:

a database for storing information about the real estate and about comparable real estate properties of business entities which are similar to the Business Entity, the database comprising means for storing space utilization information, including (i) square footage data representing a square footage of the real estate, (ii) data characterizing the selected use, (iii) data about the number of employees in the real estate, and (iv) data about the sales or revenues of the Business Entity in the real estate, means for storing cost utilization information, including (i) the square footage data, (ii) the data characterizing the selected use, (iii) rental data representing a rental price of the real estate, (iv) data about the number of employees in the real estate, and (v) data about the sales or revenues of the Business Entity in the real estate, means for storing comparable real estate information, including (i) space utilization data values and (ii) cost utilization data values of the comparable real estate, means for storing building classification information, including (i) a data classification of the real estate that is consistent with generally accepted standards, and (ii) data classifications, consistent with generally accepted standards, of buildings of the comparable real estate, means for storing area information, including (i) rent data, (ii) vacancy data, (iii) absorption rate data, and (iv) area information data of the business entities, and means for storing financial, market and environmental risk information, including (i) data representing an age of the real estate, (ii) data representing locations of man made and naturally occurring environmental hazards, (iii) data representing remaining financial obligations and encumbrances of the Business Entity for the real estate, and (iv) data representing the financial-obligations and tenancy status of the Business Entity in the real estate, (v) tenancy status and/or remaining time before a financial obligation of the Business Entity for the real estate, is terminated; and/or other measures of financial, market and environmental risks, as defined by industry, professional and/or governmental organizations and generally accepted in industry or professional practice, processor means for determining numerical indicators of the real estate by processing information in the database, the numerical indicators including a space utilization indicator, a cost utilization indicator, a grade indicator, an area indicator, and a risk indicator, the processor means comprising means for processing the space utilization indicator as a numerical representation and as a function of (i) the square footage data, (ii) the usage data, (iii) the employee data, (iv) the sales or revenue data, (v) the space utilization data values, and means for processing the cost indicator as a numerical representation and as a function of (i) the square footage data, (ii) the rental data, (iii) the usage data, (iv) the employee data, (v) the sales or revenue data, and (vi) the cost data values, means for processing the grade indicator as a numerical representation and as a function of (i) the data classification, and (ii) the data classifications, means for processing the area indicator as a numerical representation and as a function of (i) the rent data, (ii) the vacancy data, (iii) the absorption rate data, (iv) the area information data, and (v) transportation, infrastructure and demographic data, means for processing the risk indicator as a numerical representation and as a function of (i) the building age data, (ii) the man-made and naturally occurring environmental hazard location data, (iii) the data about remaining financial obligations and encumbrance of the business entities for the real estate, and (iv) the data about the tenancy status and remaining time of financial obligations of the business entities in the real estate, means for combining the indicators to produce an overall score representing a quantitative evaluation of the Business Entity's real estate condition, and to produce a report including the score and analytical information about the Business Entity's real estate, and display means for displaying the report to the Customer.

19. A system for providing real estate and facilities information to a Customer that uses, leases, buys, sells, owns, manages, consults on, and/or advises on real estate, comprising:

a database for storing information about a Business Entity and the Business Entity's real estate and about comparable real estate of business entities which are similar to the Business Entity, the information comprising space utilization and cost utilization information about the real estate and about the comparable real estate, processing means for analyzing the information the processing means providing an overall score based upon an evaluation of the information, and generating a report that includes the score and a quantitative evaluation of the Business Entity's real estate condition; and means for providing a print-out of the report.

20. A system according to claim 19, further comprising display means for outputting data and analytical information about the Business Entity's real estate; the display means displaying the report, the report further including a name of the Business Entity, and at least one of the following: (i) a portion of the data on the Business Entity and the Business Entity's real estate, (ii) real estate ratios representing the analyzed data, (iii) graphs of data comparing the Business Entity's real estate to industry averages based on similar standard industrial classification codes, and (iv) information describing the outputted data and analytical information to a Customer of the system.

21. A system according to claim 20, wherein the report further includes a name of a real estate submarket, and at least one of the following: (i) a total square feet for each of the different types and uses of the real estate in the submarket, (ii) vacancy rates for each of the different types and uses of the real estate in the submarket, (iii) absorption rates for each of the different types and uses of real estate in the submarket, (iv) rents for each of the different types and uses of real estate in the submarket, (v) terms of recent facility relocations and/or transactions for selected occupants and locations in the real estate submarket, and (vi) a list of real estate locations available for lease or sale in the real estate submarket.

22. A system according to claim 20, further comprising means for generating reports and related products that provide the following decision support tools: (i) self analysis and comparison tools, (ii) market and submarket data reports, (iii) available space reports, maps and commercial listing services, (iv) comparable real estate transactions lists and maps, (v) customer development tools, including lease aging profiles and lease aging lists, (vi) computer software, including staff, space and least negotiation models, and software for self analysis, (vii) manulas and printed reference materials, and future and derivative products.

* * * * *